(12) United States Patent
Pu et al.

(10) Patent No.: US 9,826,242 B2
(45) Date of Patent: Nov. 21, 2017

(54) PALETTE-BASED VIDEO CODING

(71) Applicant: QUALCOMM Incorporated, San Diego, CA (US)

(72) Inventors: Wei Pu, San Diego, CA (US); Feng Zou, San Diego, CA (US); Rajan Laxman Joshi, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 14/656,087

(22) Filed: Mar. 12, 2015

(65) Prior Publication Data

US 2015/0264363 A1    Sep. 17, 2015

Related U.S. Application Data

(60) Provisional application No. 61/953,667, filed on Mar. 14, 2014.

(51) Int. Cl.
| | |
|---|---|
| *H04N 7/12* | (2006.01) |
| *H04N 11/02* | (2006.01) |
| *H04N 11/04* | (2006.01) |
| *H04N 19/186* | (2014.01) |
| *H04N 19/70* | (2014.01) |
| *H04N 19/176* | (2014.01) |

(Continued)

(52) U.S. Cl.
CPC ......... *H04N 19/186* (2014.11); *H04N 19/176* (2014.11); *H04N 19/70* (2014.11); *H04N 19/90* (2014.11); *H04N 19/93* (2014.11)

(58) Field of Classification Search
CPC ...... H04N 19/186; H04N 19/93; H04N 19/90; H04N 19/176; H04N 19/70
USPC ...................................................... 375/240.02
See application file for complete search history.

(56) References Cited

U.S. PATENT DOCUMENTS

| | | |
|---|---|---|
| 5,796,864 A | 8/1998 | Callahan |
| 6,008,816 A | 12/1999 | Eisler et al. |

(Continued)

FOREIGN PATENT DOCUMENTS

WO    2014165789 A1    1/2014

OTHER PUBLICATIONS

Kbayashi Masa Aki et al: "Lossless Compression for Compound Color Document Images", IDW, HCS2-2, London UK, Jan. 1, 2001, pp. 1525-1528, XP007015578.

(Continued)

*Primary Examiner* — Jared Walker
(74) *Attorney, Agent, or Firm* — Shumaker & Sieffert, P.A.

(57) ABSTRACT

In an example, a method of coding video data includes determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line. In this example, the method also includes coding, in a scan order, index values that map pixels of the block to entries in the palette, wherein the pixel of the second line immediately follows the pixel of the first line in the scan order.

34 Claims, 10 Drawing Sheets

(51) Int. Cl.
  *H04N 19/90* (2014.01)
  *H04N 19/93* (2014.01)

(56) References Cited

U.S. PATENT DOCUMENTS

| 6,574,372 | B2 | 6/2003 | Ratnakar |
| 6,748,116 | B1 | 6/2004 | Yue |
| 7,343,037 | B1 | 3/2008 | Kadatch |
| 7,343,837 | B1 | 3/2008 | Domanico et al. |
| 2002/0159632 | A1* | 10/2002 | Chui ............... G06T 9/005 382/168 |
| 2003/0093817 | A1 | 5/2003 | Lee |
| 2003/0169932 | A1 | 9/2003 | Li et al. |
| 2004/0151372 | A1 | 8/2004 | Reshetov et al. |
| 2008/0144952 | A1* | 6/2008 | Chen ............... H04N 19/12 382/239 |
| 2010/0046628 | A1 | 2/2010 | Bhaskaran et al. |
| 2011/0110416 | A1 | 5/2011 | Lawrence |
| 2012/0082244 | A1* | 4/2012 | Chen ............... H04N 19/00103 375/240.29 |
| 2014/0147040 | A1* | 5/2014 | Tanaka ............... G06T 9/004 382/166 |
| 2014/0301475 | A1 | 10/2014 | Guo et al. |
| 2015/0016501 | A1 | 1/2015 | Guo et al. |
| 2015/0016545 | A1 | 1/2015 | Ramasubramonian et al. |

OTHER PUBLICATIONS

Response to Written Opinion dated Jun. 15, 2015, from International Application No. PCT/US2015/020483, filed on Jan. 13, 2016, 24 pp.
Second Written Opinion from International Application No. PCT/US2015/020483, dated Apr. 11, 2016, 12 pp.
Response to Second Written Opinion dated Apr. 11, 2016, from International Application No. PPCT/US2015/020483, filed on Jun. 9, 2016, 25 pp.
Guo et al., "Palette Mode for Screen Content Coding," JCT-VC Meeting; MPEG Meeting; Apr. 18-24, 2013; Incheon, KR; (Joint Collaborative Team on Video Coding of ISO/IEC JTC1/SC29/WG11 and ITU-TSG.16); URL: http://WFTP3.ITU.INT/AV-ARCH/JCTVC-SITE/, No. JCTVC-M0323_v1, Apr. 8, 2013, XP030114280, 5 pp.
"Truncated binary Coding" Wikipedia, the free encyclopedia, downloaded on Dec. 23, 2015, URL: https://en.wikipedia.org/wiki/Truncated_binary_encoding, 4 pp.
Gou L., et al., "Color palette for screen content coding", 2014 IEEE International Conference on Image Processing (ICIP), Oct. 1, 2014 (Oct. 1, 2014), pp. 5556-5560, XP055179887, DOI:10.1109/ICIP. 2014.7026124, ISBN: 978-1-47-995751-4.
Guo L., et al., "Evaluation of Palette Mode Coding on HM-12. 0+RExt-4.1", 15. JCT-VC Meeting; Oct. 23, 2013-Jan. 11, 2013; Geneva; (Joint Collaborative Team on Video Coding of ISO/IEC JTC1/SC29/WG11 and ITU-T SG.16); URL: http://wftp3.itu/int/av-arch/jctvc-site/, No. JCTVC-00218-v3, Oct. 23, 2013 (Oct. 23, 2013), XP030115268, 7 pages.
Guo L., et al., "Palette Mode for Screen Content Coding," 104. MPEG Meeting; Apr. 22, 2013-Apr. 26, 2013; Incheon; (Motion Picture Expert Group or ISO/IEC JTC1/SC29/WG11), No. m28786, Apr. 20, 2013 (Apr. 20, 2013), XP030057319, 11 pages.
Guo X., et al., "AHG8: Major-color-based screen content coding", 15. JCT-VC Meeting; Oct. 23, 2013-Jan. 11, 2013; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-00182-v3, Oct. 25, 2013 (Oct. 25, 2013), XP030115219, 10 pages.
International Search Report and Written Opinion from International Application No. PCT/US2015/020483, dated Jun. 15, 2015, 13 pp.
Islam M.R., et al., "A new image compression scheme using repeat reduction and arithmetic coding", Computers and Information Technology, 2009, ICCIT '09, 12th International Conference on, IEEE, Piscataway, NJ, USA, Dec. 21, 2009 (Dec. 21, 2009), pp. 209-214, XP031624511.
Guo, Xun. et al., "RCE4: Summary Report of HEVC Ranger Extensions Core Experiments 4 (RCE-4) on palette coding for screen content",16. JCT-VC Meeting; Jan. 9-17, 2015; San Jose; (Joint Collaborative Team on Video Coding of ISO/IEC JTC1/SC29/WG11 and ITU-T SG.I6);URL: http://wftp3.itu.int/av-arch/jctvc-site/, No. JCTVC-P0035, 8 pp.
Pu W., et al., "Non-RCE4: Refinement of the palette in RCE4 Test 2", 16. JCT-VC Meeting; Jan. 9-17, 2014; San Jose; (Joint Collaborative Team on Video Coding of ISO/IEC JTC1/SC29/WG11 and ITU-T SG.I6); URL: http:/wftp3.itu.int/av-arch/jctvc-site/, No. JCTVC-P0231-v5, Jan. 12, 2014 (Jan. 12, 2014), XP030115774, 4 pages.
Erh-Chung Ke et al., "Non-RCE4: Advanced copy mode for Palette Coding", 16 JCTVC Meeting, Jan. 9-17, 2014; San Jose; (Joint Collaborative Team on Video Coding of ISO/IEC JTC1/SC29/WG11 and TU-T SG.I6); URL: http://wftp3.itu.int/av-arch/jctvc-site/, No. JCTVC-P0090, 5 pp.
Guo, et al., "RCE4: Test 1. Major-color-based screen content coding", 16. JCT-VC Meeting; Jan. 9-17, 2014; San Jose; (Joint Collaborative Team on Video Coding of ISO/IEC JTC1/SC29/WG11 and ITU-T SG-I6); URL: http://wftp3.itu.int/av-arch/jctvc-site/, No. JCTVC-P0108, 12 pp.
Chen J et al: "Description of screen content coding technology proposal by Qualcomn" 17. JCT-VC Meeting; Valencia; (Joint Collaborative Team on Video Coding of ISO/IEC JTC1/SC29/WG11 and ITU-T SG.16) No. JCTVC-Q0031-v3t, Mar. 28, 2014 (Mar. 28, 2014)t XP030115916, abstract; figures 1-3, Section 2.7.1.
Cuiling Lan et al: "Compress Compound Images in H.264/MPGE-4 AVC by Exploiting Spatial Correlation" IEEE Transactions on Image Processing, IEEE Service Center, Piscataway, NJ US, vol. 18, No. 4, Apr. 1, 2010 (Apr. 1, 2010), pp. 946-957t XP011298469, ISSN: 1057-7149, abstract; figures 3, 5, 6, Section III.
Lin, et al., "Compound Image Compression for Real-Time Computer Screen Image Transmission", IEEE Transactions on Image Processing, IEEE Service Center, Piscataway, NJ, US, vol. 14, No. 8; Aug. 2005, XP011136219, ISSN: 1057-7149, DOI:10.1109/TIP. 2005.849776, pp. 993-1005.
Lan, et al., "Intra and inter coding tools for screen contents", IEEE Service Center, No. JCTVC-E145, Mar. 16-23, 2011, XP030008651, 11 pp.
Murray, et al., "Run-Length Encoding (RLE)", Encyclopedia of graphics file formats (2nd Edition), Apr. 1, 1996 (Apr. 1, 1996), XP55126024, ISBN: 978-1-56 592161-0, [retrieved on Jun. 30, 2014], 9 pp.
Lan, et al., "Compression of Compound Images by Combining Several Strategies," IEEE Service Center, Oct. 17-19, 2011, 6 pp.
Lan, et al., "Scren content coding," (Joint Collaborative Team on Video Coding of ISO/IEC JTC1/SC29/WG11 and ITU-T SG.16), Jul. 21-28, 2010, Document: JCTVC-B084 _r1, 10 pp.
Guo, et al.,"RCE4: Results of Test 2 on Palette Mode for Screen Content Coding", JCT-VC Meeting; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198-v3, Jan. 8, 2014 (Jan. 8, 2014), XP030115731, 5 pp.
Ivanov, et al., "Color Distribution—A New Approach to Texture Compression", Computer Graphics Forum, Wiley-Blackwell Publishing Ltd, GB, vol. 19, No. 3, Aug. 21, 2000, 8 pp.
Laroche, et al., "Non-RCE4: Palette Prediction for Palette mode", JCT-VC Meeting; Jan. 9-17, 2014; San Jose; (Joint Collaborative Team on Video Coding of ISO/IEC JTC1/SC29/WG11 and ITU-TSG.16 ); URL: http://wftp3.itu.int/av-arch/jctvc-site/, No. JCTVC-P0114-v3, 6 pp.
Zhu, et al., "Template-based palette prediction", JCT-VC Meeting; Apr. 18-26, 2013; Vienna; (Joint Collaborative Team on Video Coding of ISO/IEC JTC1/SC29/WG11 and ITU-TSG.16 ) ; URL: http://wftp3.itu.int/av-arch/jctvc-site/, No. JCTVC-N0169, XP030114647, 3 pp.
U.S. Appl. No. 14/743,883, filed Jun. 18, 2015, filed by Zou, et al. Guo, et al., "Non-RCE3: Modified Palette Mode for Screen Content Coding, " JCT-VC Meeting; Jul. 25-Aug. 2, 2013, Vienna, (Joint

(56) References Cited

OTHER PUBLICATIONS

Collaborative Team on Video Coding of ISO/IEC JTC1/SC29/WG11 and ITU-T SG.16 ), URL: http://wftp3.itu.int/av-arch/jctvc-site/, No. JCTVC-N0249, XP030114767, 6 pp.

Zhang, et al., "AHG7: An efficient coding method for DLT in 3D-HEVC", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/,,No. JCT3V-E0176-v3, XP030131209, 5 pp.

Zou, et al., "CE18: Test 7.1 Constrained Run for Intra String Copy", JCT-VC Meeting, Oct. 17-24, 2014, Strasbourg, (Joint Collaborative Team on Video Coding of ISO/IEC JTC1/SC29/WG11 and ITU-T SG.16), URL: http://wftp3.itu.int/av-arch/jctvc-site/, No. JCTVC-S0175, XP030116955, 3 pp.

Zou, et al., "CE6: Test C.3 Copy Previous Row Mode for Palette Coding," JCT-VC Meeting, Oct. 17-24, 2014, Strasbourg, (Joint Collaborative Team on Video Coding of ISO/IEC JTC1/SC29/WG11 and ITU-T SG.16 ), URL: http://wftp3.itu.int/av-arch/jctvc-site/, No. JCTVC-S0174, XP030116953, 5 pp.

Zou, et al., "Non-SCCE3: Copy from previous row mode for palette coding ," JCT-VC Meeting; Jun. 3-Jul. 9, 2014; Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-R0282-v4, XP030116495, 3 pp.

Zou, et al., "Non-SCCE4: Constrained Run for 1D Dictionary Coding, " JCT-VC Meeting; Jun. 30-Jul. 9, 2014; Sapporo, (Joint Collaborative Team on Video Coding of ISO/IEC JTC1/SC29/WG11 and ITU-T SG.16 ), URL: http://wftp3.itu.int/av-arch/jctvc-site/, No. JCTVC-R0225, XP030116525, 4 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

G. Gisquet, G. Laroche, and P. Onno, "Non-RCE4: Transition copy mode for Palette mode," 16th Meeting;San Jose, US, Jan. 9-14, 2014; Joint Collaborative Team on Video Coding of ITU-T SG 16 WP 3 and ISO/IEC JTC1/SC 29/WG11)); URL: http://wftp3.itu.int/av-arch/jctvc-site/, No. JCTVC-P0115, 6 pp.

International Preliminary Report on Patentability from International Application No. PCT/US2015/020483, dated Jul. 7, 2016 , 8 pp.

* cited by examiner

Horizontal Mode

Vertical Mode

Normal Mode

Copy Mode

Run Mode

Pixel Mode

PALETTE-BASED VIDEO CODING

This application claims the benefit of U.S. Provisional Application No. 61/953,667, filed Mar. 14, 2014, the entire contents of which are incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to palette-based video coding. For example, in palette based coding, a video coder (a video encoder or video decoder) may form a so-called "palette" as a table of colors for representing the video data of the particular area (e.g., a given block). Palette-based coding may be especially useful for coding areas of video data having a relatively small number of colors. Rather than coding actual pixel values (or their residuals), the video coder may code index values for one or more of the pixels that relate the pixels with entries in the palette representing the colors of the pixels. A palette may be explicitly encoded and sent to the decoder, predicted from previous palette entries, or a combination thereof. The techniques described in this disclosure may include techniques for various combinations of one or more of signaling palette-based coding modes, coding palettes, predicting palettes, deriving palettes, and coding palette-based coding maps and other syntax elements.

In one example, a method of coding video data includes determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line. In this example, the method also includes coding, in a scan order, index values that map pixels of the block to entries in the palette, wherein the pixel of the second line immediately follows the pixel of the first line in the scan order.

In another example, an apparatus for coding video data includes a memory configured to store a block of video data, and one or more processors. In this example, the one or more processors are configured to: determine for the block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line; and code, in a scan order, index values that map pixels of the block to entries in the palette, wherein the pixel of the second line immediately follows the pixel of the first line in the scan order.

In another example, an apparatus for coding video data includes means for determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line; and means for coding, in a scan order, index values that map pixels of the block to entries in the palette, wherein the pixel of the second line immediately follows the pixel of the first line in the scan order.

In another example, a computer-readable medium stores instructions thereon that, when executed, cause one or more processors of a video coder to: determine, for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line; and code, in a scan order, index values that map pixels of the block to entries in the palette, wherein the pixel of the second line immediately follows the pixel of the first line in the scan order.

The details of one or more examples of the disclosure are set forth in the accompanying drawings and the description below. Other features, objects, and advantages will be apparent from the description, drawings, and claims.

DETAILED DESCRIPTION

Figure 1:
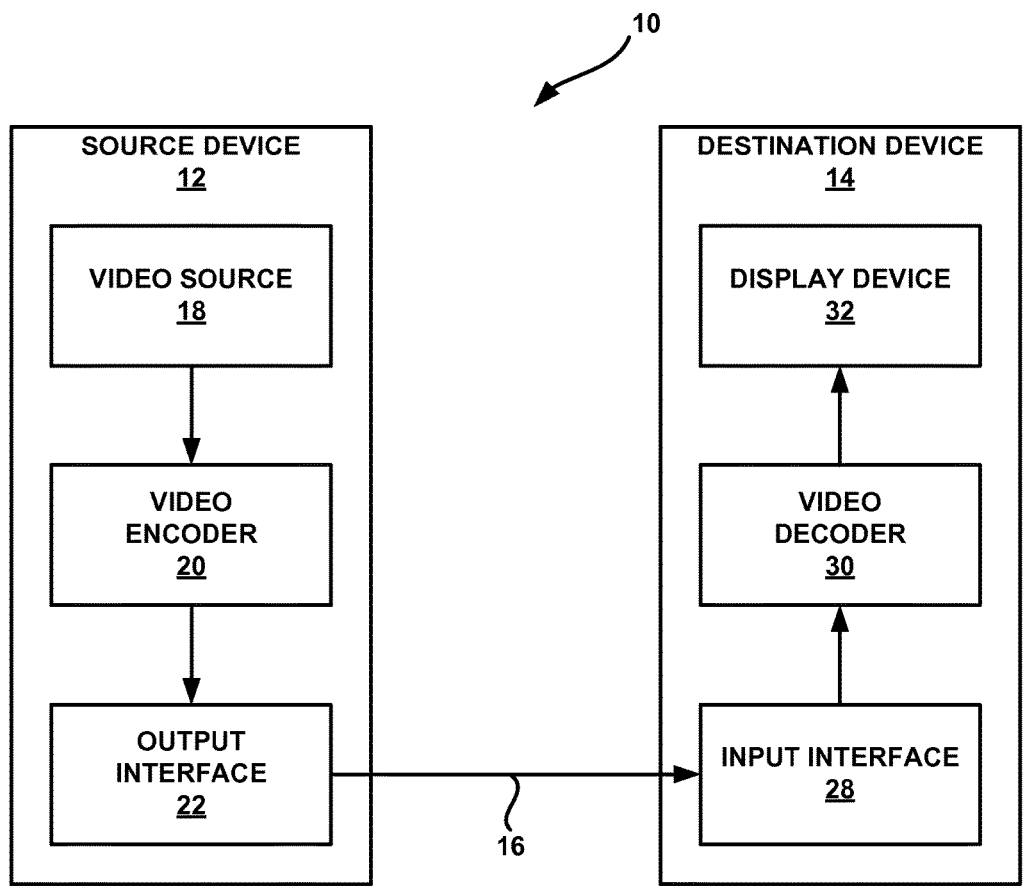
FIG. 1 is a block diagram illustrating an example video coding system that may utilize the techniques described in this disclosure.

This disclosure includes techniques for video coding and compression. In particular, this disclosure describes techniques for palette-based coding of video data. In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content (e.g., such as text or computer graphics) may be the dominant content to be compressed. This type of content tends to have discrete-tone and feature sharp lines, and high contrast object boundaries. The assumption of continuous-tone and smoothness may no longer apply for screen content, and thus traditional video coding techniques may not be efficient ways to compress video data that includes screen content.

This disclosure describes palette-based coding, which may be particularly suitable for screen generated content coding. For example, assuming a particular area of video data has a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that maps the pixel value to the appropriate entry in the palette.

In the example above, a video encoder may encode a block of video data by determining a palette for the block (e.g., coding the palette explicitly, predicting it, or a combination thereof), locating an entry in the palette to represent the value of each pixel, and encoding the palette with index values for the pixels mapping the pixel value to the palette. A video decoder may obtain, from an encoded bitstream, a palette for a block, as well as index values for the pixels of the block. The video decoder may map the index values of the pixels to entries of the palette to reconstruct the pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification is described in Bross et al., "High Efficiency Video Coding (HEVC) Text Specification," ("HEVC Version 1"), available at: www.itu.int/rec/T-REC-H.265-201304-I.

With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Aspects of this disclosure relate to coding index values that map pixels of a block to entries in a palette that each correspond to a respective color value. A video coder may code the index values of a map in a particular order, which may be referred to as a scan order or a scan direction. For instance, as described in greater detail with respect to the example of FIG. 6A below, the indices of a map may be scanned from top to bottom, left to right in what may be referred to as a raster scan order. In a raster scan order, the first index of a current line may be scanned directly after the last index of a previous line.

However, in some examples, scanning the indices in a raster scan order may not be efficient. For instance, where a first line of a block of video data includes a first pixel adjacent to a first edge of the block of video data and a last pixel adjacent to a second edge of the block of video data, a second line of the block of video data includes a first pixel adjacent to the first edge of the block of video data and a last pixel adjacent to the second edge of the block of video data, the last pixel of the first line is adjacent to the last pixel of the second line, and the first edge and the second edge are parallel, the last pixel in the first line is the same as the last pixel in the second line, but different from the first pixel in the second line. This situation (i.e., where the last pixel in the first line is the same or similar to the last pixel in the second line, but different from the first pixel in the second line) may occur more frequently in computer generated screen content than other types of video content. In other words, for screen content, there may be a higher probability that pixels located at the same edge of a block having the same or similar values than pixels located at opposite edges of a block. Raster scanning may not take advantage of such a correlation.

In accordance with one or more techniques of this disclosure, a video coder may utilize a snake scan order when encoding the map. For instance, to continue with the above example and as described in greater detail below with respect to the example of FIG. 6B, video encoder 20 may code the map such that the last pixel of the second line is scanned immediately following the last pixel of the first line in the scan order. In this way, video encoder 20 may improve the efficiency of run-length coding.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC version 1.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in HEVC Version 1. In addition to the base HEVC standard, there are ongoing efforts to produce scalable video coding, multiview video coding, and 3D coding extensions for HEVC. In addition, palette-based coding modes, e.g., as described in this disclosure, may be provided for in an extension of the HEVC standard. In some examples, the techniques described in this disclosure for palette-based coding may be applied to encoders and decoders configured to operation according to other video coding standards, such as theITU-T-H.264/AVC standard or future standards. Accordingly, application of a palette-based coding mode for coding of coding units (CU's) or prediction units (PU's) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks of macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single MV. When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20.

For instance, video decoder 30 may use MVs of PUs to determine predictive sample blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example above, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

Aspects of this disclosure are directed to palette derivation. As one example, video encoder 20 may derive a palette for a current block by deriving a histogram of the pixels in the current block. In some examples, the histogram may be expressed as $H=\{(v_i, f_i), i=\{0, 1, 2, \ldots, M\}\}$ where $M+1$ is the number of different pixel values in the current block, $v_i$ is pixel value, $f_i$ is the number of occurrence of $v_i$ (i.e., how many pixels in the current block have pixel value $v_i$). In such examples, the histogram generally represents a number of times that a pixel value occurs in the current block.

Video encoder 20 may initialize one or more variables when deriving the histogram. As one example, video encoder 20 may initialize a palette index idx to 0, (i.e., set idx=0). As another example, video encoder 20 may initialize the palette P to be empty (i.e., $P=\emptyset$, set j=0.).

Video encoder 20 may sort the histogram, e.g., in descending order, such that pixels having more occurrences are placed near the front of a list of values. For instance, video encoder 20 may sort H according to the descending order of $f_i$ and the ordered list may be expressed as $H_o=\{(u_j, f_j), i=\{0, 1, 2, \ldots, M\}, f_i \geq f_{i+1}\}$. In this example, the ordered list includes the most frequently occurring pixel values at the front (top) of the list and the least frequently occurring pixel values at the back (bottom) of the list.

Video encoder 20 may copy one or more entries from the histogram into the palette. As one example, video encoder 20 may insert the entry in the histogram with the greatest frequency into the palette. For instance, video encoder 20 may insert (j, $u_j$) into the palette P (i.e., $P=P \cup \{(idx,u_j)\}$). In some examples, after inserting the entry into the palette, video encoder 20 may evaluate the entry in the histogram with the next greatest frequency for insertion into the palette. For instance, video encoder 20 may set idx=idx+1, j=j+1.

Video encoder 20 may determine whether the entry with the next greatest frequency (i.e., $u_{j+1}$) is within the neighborhood of any pixel (i.e., x) in the palette (i.e., Distance ($u_{j+1}$, x)<Thresh). For instance, video encoder 20 may determine whether the entry is within the neighborhood of any pixel in the palette by determining whether a value of the entry is within a threshold distance of a value of any pixel in the palette. In some examples, video encoder 20 may flexibly select the distance function. As one example, video encoder 20 may select the distance function as a sum of absolute differences (SAD) or a sum of squared errors of prediction (SSE) of the three color components (e.g., each of luminance, blue hue chrominance, and red hue chrominance), or one color component (e.g., one of luminance, blue hue chrominance, or red hue chrominance). In some examples, video encoder 20 may flexibly select the threshold value Thresh. As one example, video encoder 20 may select the threshold value to be dependent on the quantization parameter (QP) of the current block. As another example, video encoder 20 may select the threshold value to be dependent on the value of idx or the value of j.

If video encoder 20 determines that the entry with the next greatest frequency (i.e., $u_{j+1}$) is within the neighborhood of any pixel in the palette, video encoder 20 may not insert the entry in the histogram. If video encoder 20 determines that the entry with the next greatest frequency (i.e., $u_{j+1}$) is not within the neighborhood of any pixel in the palette, video encoder 20 may insert the entry in the histogram.

Video encoder 20 may continue to insert entries in the palette until one or more conditions are satisfied. Some example conditions are when idx=M, when j=M, or when the size of the palette is larger than a predefined value.

Palette-based coding may have a certain amount of signaling overhead. For example, a number of bits may be needed to signal characteristics of a palette, such as a size of the palette, as well as the palette itself. In addition, a number of bits may be needed to signal index values for the pixels of the block. The techniques of this disclosure may, in some examples, reduce the number of bits needed to signal such information. For example, the techniques described in this disclosure may include techniques for various combinations of one or more of signaling palette-based coding modes, transmitting palettes, predicting palettes, deriving palettes, and transmitting palette-based coding maps and other syntax elements.

In some examples, video encoder 20 and/or video decoder 30 may predict a palette using another palette. For example, video encoder 20 and/or video decoder 30 may determine a first palette having first entries indicating first pixel values. Video encoder 20 and/or video decoder 30 may then determine, based on the first entries of the first palette, one or more second entries indicating second pixel values of a second palette. Video encoder 20 and/or video decoder 30 may also code pixels of a block of video data using the second palette.

When determining the entries of the second palette based on the entries in the first palette, video encoder 20 may encode a variety of syntax elements, which may be used by video decoder to reconstruct the second palette. For example, video encoder 20 may encode one or more syntax elements in a bitstream to indicate that an entire palette (or palettes, in the case of each color component, e.g., Y, Cb, Cr, or Y, U, V, or R, G, B, of the video data having a separate palette) is copied from one or more neighboring blocks of the block currently being coded. The palette from which entries of the current palette of the current block are predicted (e.g., copied) may be referred to as a predictive palette. The predictive palette may contain palette entries from one or more neighboring blocks including spatially neighboring blocks and/or neighboring blocks in a particular scan order of the blocks. For example, the neighboring blocks may be spatially located to the left (left neighboring block) of or above (upper neighboring block) the block currently being coded. In another example, video encoder 20 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Video encoder 20 may encode one or more syntax elements to indicate the location of the neighboring blocks from which the palette(s) are copied.

In some examples, palette prediction may be performed entry-wise. For example, video encoder 20 may encode one or more syntax elements to indicate, for each entry of a predictive palette, whether the palette entry is included in the palette for the current block. If video encoder 20 does not predict an entry of the palette for the current block, video encoder 20 may encode one or more additional syntax elements to specify the non-predicted entries, as well as the number of such entries.

The syntax elements described above may be referred to as a palette prediction vector. For example, as noted above, video encoder 20 and video decoder 30 may predict a palette for a current block based on one or more palettes from neighboring blocks (referred to collectively as a reference palette). When generating the reference palette, a first-in first-out (FIFO) may be used by adding the latest palette into the front of the queue. If the queue exceeds a predefined threshold, the oldest elements may be popped out. After pushing new elements into the front of the queue, a pruning process may be applied to remove duplicated elements, counting from the beginning of the queue. Specifically, in some examples, video encoder 20 may encode (and video decoder 30 may decode) a 0-1 vector to indicate whether the pixel values in the reference palette are reused for the current palette. As an example, as shown in the example of Table 1 below, a reference palette may include six items (e.g., six index values and respective pixel values).

TABLE 1

| Index | Pixel Value |
|---|---|
| 0 | $v_0$ |
| 1 | $v_1$ |
| 2 | $v_2$ |
| 3 | $v_3$ |
| 4 | $v_4$ |
| 5 | $v_5$ |

In an example for purposes of illustration, video encoder 20 may signal a vector (1, 0, 1, 1, 1, 1) that indicates that $v_0$, $v_2$, $v_3$, $v_4$, and $v_5$ are reused in the current palette, while $v_1$ is not re-used. In addition to reusing $v_0$, $v_2$, $v_3$, $v_4$, and $v_5$, video encoder 20 may add two new items to the current palette with indexes by 5 and 6. The current palette for this example is shown in Error! Reference source not found. below

TABLE 2

| Pred Flag | Index | Pixel Value |
|---|---|---|
| 1 | 0 | $v_0$ |
| 0 | | |
| 1 | 1 | $v_2$ |
| 1 | 2 | $v_3$ |
| 1 | 3 | $v_4$ |
| 1 | 4 | $v_5$ |
| | 5 | $u_0$ |
| | 6 | $u_1$ |

To code the palette prediction 0-1 vector, for each item in the vector, video encoder 20 may code one bit to represent its value and the bit may be coded using CABAC bypass. With respect to CABAC, as an example, a video coder (video encoder 20 or video decoder 30) may select a probability model (also referred to as a context model) to code symbols associated with a block of video data. For example, at the encoder, a target symbol may be coded by using the probability model. At the decoder, a target symbol may be parsed by using the probability model. In some instances, bins may be coded using a combination of context adaptive and non-context adaptive coding. For example, a video coder may use a bypass mode to bypass, or omit, the regular arithmetic coding context adaptation process for one or more bins, while using context adaptive coding for other bins. In such examples, the video coder may use a fixed probability model to bypass code the bins. That is, bypass coded bins do not include context or probability updates. In general, context coding bins may refer to coding the bins using a context coding mode. Likewise, bypass coding bins may refer to as coding the bins using a bypass coding mode.

However, due to the high correlation between palettes, the zero and one in the palette prediction vector may not be equally distributed, which may affect coding efficiency, e.g., because the 0-1 vector may not leverage the high correlation between palettes. Additionally, the number of palette items which cannot be predicted (e.g., the number of new palette entries (u0 and u1 in the example of Table 2 above)) may be binarized and signaled using unary code with each bit coded using CABAC bypass. Similar to the issues in palette prediction vector, modeling each bit in the unary code to have equal probability may be suboptimal, e.g., because, in practice, bits in the unary code may have different probabilities.

In accordance with one or more techniques of this disclosure, video encoder 20 may code the palette prediction vector and/or the unary coded remaining palette size using CABAC with context(s), e.g., to improve coding efficiency relative to techniques that rely on bypass coding of such bins. In some examples, the items in the palette prediction vector can share a single CABAC context. In this way, the complexity may be reduced. In some examples, the unary code can use a single context. Also in this way, the complexity may be reduced.

In some examples, video encoder 20 may code the index values using fix length coding. In such examples, video encoder 20 may code each bit in the fix length code using CABAC bypass. However, in some cases, the number of indices in the palette may not be a power of two. In such cases, the codewords of the fix length code may not be fully utilized. For instance, if the palette size is 5, the indices will be 0, 1, 2, 3, and 4. To code each index with fix length code, video encoder 20 would have to use three bits. However, by using three bits, video encoder 20 may waste three codewords (8−5=3), which could affect coding efficiency. In some cases, a similar issue may occur when video encoder 20 codes escape pixels. In accordance with one or more techniques of this disclosure, as opposed to using fixed length coding, video encoder 20 may utilize truncated binary code to code the index values and/or the escape pixels.

Other aspects of this disclosure relate to constructing and/or transmitting a map that allows video encoder 20 and/or video decoder 30 to determine pixel values. For example, other aspects of this disclosure relate constructing and/or transmitting a map of indices that relate a particular pixel to an entry of a palette.

In some examples, video encoder 20 may indicate whether pixels of a block have a corresponding value in a palette. In an example for purposes of illustration, assume that an (i, j) entry of a map corresponds to an (i, j) pixel position in a block of video data. In this example, video encoder 20 may encode a flag for each pixel position of a block. Video encoder 20 may set the flag equal to one for the (i, j) entry to indicate that the pixel value at the (i, j) location is one of the values in the palette. When a color is included in the palette (i.e., the flag is equal to one) video encoder 20 may also encode data indicating a palette index for the (i, j) entry that identifies the color in the palette. When the color of the pixel is not included in the palette (i.e., the flag is equal to zero) video encoder 20 may also encode data indicating a sample value for the pixel, which may be referred to as an escape pixel. Video decoder 30 may obtain the above-described data from an encoded bitstream and use the data to determine a palette index and/or pixel value for a particular location in a block.

In some instances, there may be a correlation between the palette index to which a pixel at a given position is mapped and the probability of a neighboring pixel being mapped to the same palette index. That is, when a pixel is mapped to a particular palette index, the probability may be relatively high that one or more neighboring pixels (in terms of spatial location) are mapped to the same palette index.

In some examples, video encoder 20 and/or video decoder 30 may determine and code one or more indices of a block of video data relative to one or more indices of the same block of video data. For example, video encoder 20 and/or video decoder 30 may be configured to determine a first index value associated with a first pixel in a block of video data, where the first index value relates a value of the first pixel to an entry of a palette. Video encoder 20 and/or video decoder 30 may also be configured to determine, based on the first index value, one or more second index values associated with one or more second pixels in the block of video data, and to code the first and the one or more second pixels of the block of video data. Thus, in this example, indices of a map may be coded relative to one or more other indices of the map.

Video encoder 20 and/or video decoder 30 may use several methods to code indices of a map relative to one or more other indices of the map. For instance, Guo et al., "RCE4: Summary report of HEVC Range Extensions Core Experiments 4 (RCE4) on palette coding for screen content," Document JCTVC-P0035, Joint Collaborative Team on Video Coding (JCT-VC) of ITU-T SG 16 WP 3 and ISO/IEC JTC 1/SC 29/WG 11, 16th Meeting: San José, US, 9-17 Jan. 2014, available at http://phenix.it-sud-paris.eu/jct/doc_end_user/current_document.php?id=8765 (hereinafter, "JCTVC-P0035"), describes two methods of palette mode coding which were reported to achieve significant BD-rate reduction, especially when coding screen content.

The first method described by JCTVC-P0035 to code indices of a map relative to one or more other indices of the map provides for three coding modes. For each pixel line, a flag may signaled to indicate the coding mode. The first method may have three modes: horizontal mode, vertical mode, and normal mode. Additionally, if the pixel is classified as an escape pixel, the pixel value may be transmitted. The horizontal mode, vertical mode, and normal mode are described in further detail with reference to FIGS. 7A-7C, below.

The second method described by JCTVC-P0035 to code indices of a map relative to one or more other indices of the map provides for the use of an entry-wise prediction scheme to code the current palette based on the palette of the left CU. The second method provides that the pixels in the CU are encoded in a raster scan order using three modes, a "Copy above mode," a "Run Mode," and a "Pixel mode." The "Copy above mode," a "Run Mode," and a "Pixel mode" are described in further detail with reference to FIGS. 8A-8C, below.

In essence, both of the above two methods described by JCTVC-P0035 share a similar structure of copying previous reconstructed pixels. Similar to run-length coding, the candidate start position and the run-length have to be coded. For example, in the first method, there are up to four candidate start copying positions. For vertical mode and horizontal mode, the run-length is implicitly assigned to be the width of the line, for normal mode, the run-length is implicitly assigned to 1. Different from the first method, the run-length value in the second method is explicitly coded, e.g., in the bitstream. In some examples, the second method may have better coding efficiency than the first method, e.g., due to its more flexible structure.

In some examples, video encoder 20 may encode one or more syntax elements indicating a number of consecutive pixels in a given scan order that are mapped to the same index value. The string of like-valued index values may be referred to herein as a "run" and may be coded using a mode similar to the "run mode" described by JCTVC-P0035. In some examples, a pixel value may be associated with exactly one index value in a palette. Accordingly, in some instances, a run of values may also refer to a string of like-valued pixel values. In other examples, as described with respect to lossy coding below, more than one pixel value may map to the same index value in a palette. In such examples, a run of values refers to like-valued index values.

In an example for purposes of illustration, if two consecutive indices in a given scan order have different values, the run is equal to zero. If two consecutive indices in a given scan order have the same value but the third index in the scan order has a different value, the run is equal to one. Video decoder 30 may obtain the syntax elements indicating a run from an encoded bitstream and use the data to determine the number of consecutive pixel locations that have the same index value.

Additionally or alternatively, video encoder 20 and video decoder 30 may perform line copying for one or more entries of a map. In such cases, the indices may be coded using a mode similar to the "copy above mode" described by JCTVC-P0035. The entries may also be referred to as "positions" due to the relationship between entries of the map and pixel positions of a block. The line copying may depend, in some examples, on the scan direction. For example, video encoder 20 may indicate that a pixel value or index map value for a particular position in a block is equal to the pixel or index value in a line above the particular position (for a horizontal scan) or the column to the left of the particular position (for a vertical scan). Video encoder 20 may also indicate, as a run, the number of pixel values or indices in the scan order that are equal to the corresponding pixel values or indices above or the column to the left of the particular position. In this example, video encoder 20 and or video decoder 30 may copy pixel or index values from the specified neighboring line and from the specified number of entries for the line of the block currently being coded.

In some instances, the line from which values are copied may be directly adjacent to, e.g., above or to the left of, the line of the position currently being coded. In other examples, a number of lines of the block may be buffered by video encoder 20 and/or video decoder 30, such that any of the number of lines of the map may be used as predictive values for a line of the map currently being coded. In an example for purposes of illustration, video encoder 20 and/or video decoder 30 may be configured to store the previous four rows of indices or pixel values prior to coding the current row of pixels. In this example, the predictive row (the row from which indices or pixel values are copied) may be indicated in a bitstream with a truncated unary code or other codes such as unary codes. With respect to a truncated unary code, video encoder 20 and/or video decoder 30 may determine a maximum value for the truncated unary code based on a maximum row calculation (e.g., row_index-1) or a maximum column calculation (e.g., column_index-1). In addition, an indication of the number of positions from the predictive row that are copied may also be included in the bitstream. In some instances, if the line or column from which a current position is being predicted belongs to another block (e.g., CU or CTU) such prediction may be disabled or a default index value (e.g., 0) may be used.

In some examples, the techniques for coding so-called runs of entries may be used in conjunction with the techniques for line copying described above. For example, video encoder 20 may encode one or more syntax elements (e.g., a flag) indicating whether the value of an entry in a map is obtained from a palette or the value of an entry in the map is obtained from a previously coded line in the map (e.g., copy mode or pixel mode). Video encoder 20 may also encode one or more syntax elements indicating an index value of a palette or the location of the entry in the line (the row or column). Video encoder 20 may also encode one or more syntax elements indicating a number of consecutive entries that share the same value (e.g., run mode). Video decoder 30 may obtain such information from an encoded bitstream and use the information to reconstruct the map and pixel values for a block.

As noted above, the indices of a map are scanned in a particular order, which may be referred to as a scanning order or a scanning direction. Hence, scanning indices generally the indices in a particular scanning order generally refers to the manner in which indices are included in (or parsed from) a bitstream. In some examples, the scan order may be vertical, horizontal, or at a diagonal (e.g., 45 degrees or 135 degrees diagonally in block). For instance, as illustrated and described in greater detail with respect to the example of FIG. 6A below, the indices of a map may be scanned from top to bottom, left to right in what may be referred to as a raster scan order. In a raster scan order, the first index of a current line may be scanned directly after the last index of a previous line.

However, in some examples, scanning the indices in a raster scan order may not be efficient. For instance, where a first line of a block of video data includes a first pixel adjacent to a first edge of the block of video data and a last pixel adjacent to a second edge of the block of video data, a second line of the block of video data includes a first pixel adjacent to the first edge of the block of video data and a last pixel adjacent to the second edge of the block of video data, the last pixel of the first line is adjacent to the last pixel of the second line, and the first edge and the second edge are parallel, the last pixel in the first line is the same as the last pixel in the second line, but different from the first pixel in the second line. This situation (i.e., where the last pixel in the first line is the same or similar to the last pixel in the second line, but different from the first pixel in the second line) may occur more frequently in computer generated screen content than other types of video content. In other words, for screen content, there may be a higher probability that pixels located at the same edge of a block having the same or similar values than pixels located at opposite edges of a block. Raster scanning may not take advantage of such a correlation.

In accordance with one or more techniques of this disclosure, video encoder 20 may utilize a snake scan order when encoding the map. For instance, to continue with the above example and as described in greater detail below with respect to the example of FIG. 6B, video encoder 20 may encode the map such that the last pixel of the second line is scanned directly after the last pixel of the first line in the scan order. In this way, video encoder 20 may improve the efficiency of run-length coding.

Video decoder 30 may also utilize a snake scan order when decoding the map. For instance, video decoder 30 may decode the map such that the last pixel of the second line is scanned directly after the last pixel of the first line in the scan order. In this way, video decoder 30 may improve the efficiency of run-length coding.

In some examples, video encoder 20 or video decoder 30 may use one or more other scanning orders which may include, but are not limited to, vertical scanning, piano shaped, and zigzag. A piano shaped scan order may be represented by following the edges of the white keys of a piano where each key is two pixels wide at the top (between the black keys) and at least two pixels wide at the bottom.

In some examples, video encoder 20 may encode one or more syntax elements for each block indicating a scan direction for scanning the indices of the block. Additionally or alternatively, the scan direction may be signaled or inferred based on so-called side information such as, for example, block size, color space, and/or color component. Video encoder 20 may specify scans for each color component of a block. Alternatively, a specified scan may apply to all color components of a block.

When a palette-based coding mode is used, a palette is transmitted by video encoder 20, e.g., using one or more of the techniques described herein, in the encoded video data bitstream for use by video decoder 30. A palette may be transmitted for each block or may be shared among a number of blocks. The palette may refer to a number of pixel values that are dominant and/or representative for the block.

In some examples, the size of the palette, e.g., in terms of the number of pixel values that are included in the palette, may be fixed or may be signaled using one or more syntax elements in an encoded bitstream. As described in greater detail below, a pixel value may be composed of a number of samples, e.g., depending on the color space used for coding. For example, a pixel value may include luma and chrominance samples (e.g., luma, U chrominance and V chrominance (YUV) or luma, Cb chrominance, and Cr chrominance (YCbCr) samples). In another example, a pixel value may include Red, Green, and Blue (RGB) samples. As described herein, the term pixel value may generally refer to one or more of the samples contributing to a pixel. That is, the term pixel value does not necessarily refer to all samples contributing to a pixel, and may be used to describe a single sample value contributing to a pixel.

In some examples, the techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

Figure 2:
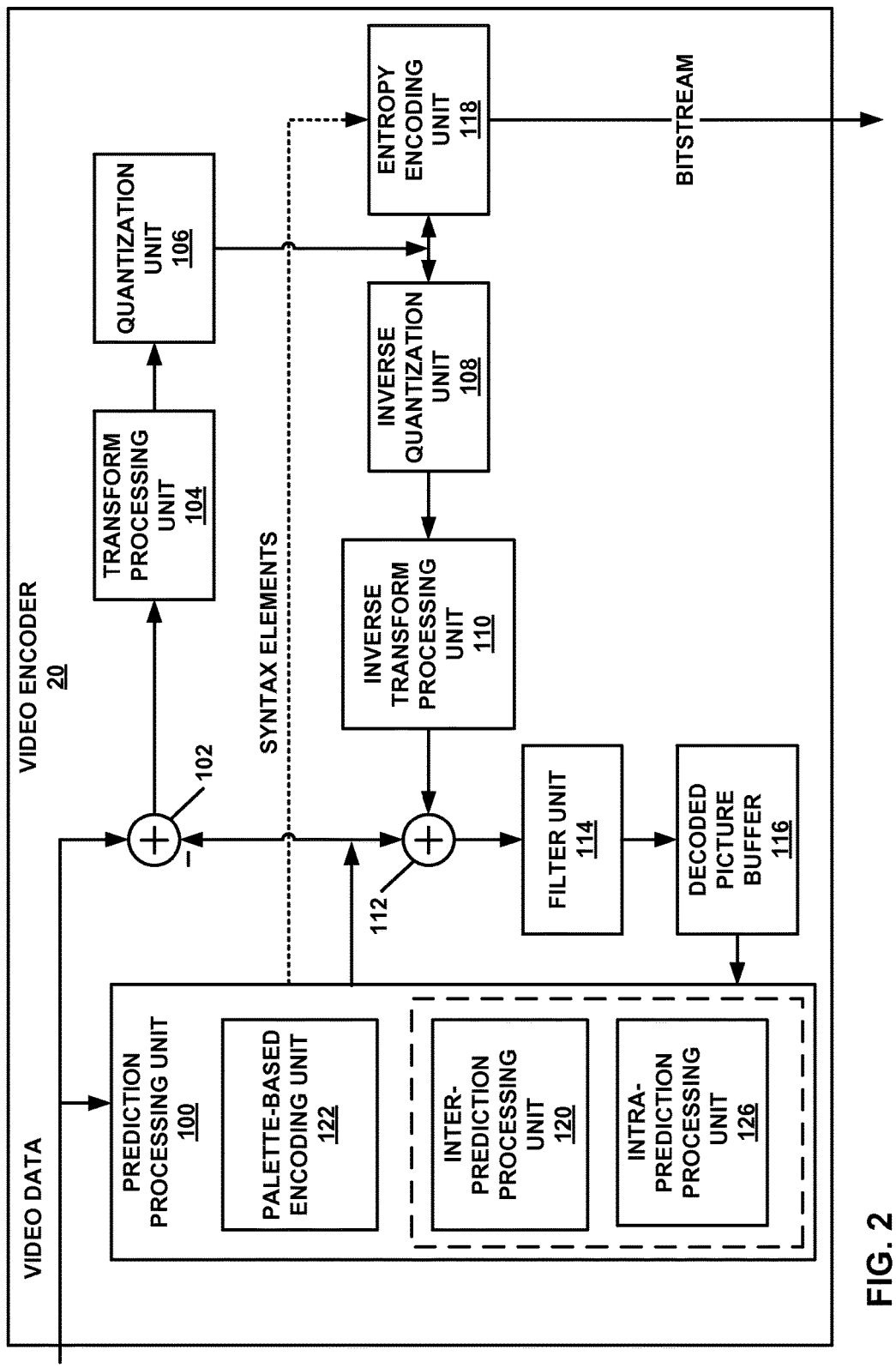
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

Video encoder 20, in one example, may be configured to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. The signaled information may be used by video decoder 30 to decode video data.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive sample blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a coding unit (CU) mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

In some examples, palette-based encoding unit 122 may encode the palette index values indicated by the information that associates at least some positions of the block with entries in the palette in a particular order. For instance, the scan order used by palette-based encoding unit 122 to encode the palette index values may be the same scan order used by a palette-based decoding unit, such as palette-based decoding unit 165 of video decoder 30, to decode the palette index values. In some examples, palette-based encoding unit 122 may encode one or more syntax elements to specify the scan order used to code the palette index values.

As discussed above, the indices of a map may be scanned from top to bottom, left to right in what may be referred to as a raster scan order. In a raster scan order, the first index of a current line may be scanned directly after the last index of a previous line.

However, in some examples, scanning the indices in a raster scan order may not be efficient. For instance, where a first line of a block of video data includes a first pixel adjacent to a first edge of the block of video data and a last pixel adjacent to a second edge of the block of video data, a second line of the block of video data includes a first pixel adjacent to the first edge of the block of video data and a last pixel adjacent to the second edge of the block of video data, the last pixel of the first line is adjacent to the last pixel of the second line, and the first edge and the second edge are parallel, the last pixel in the first line is the same as the last pixel in the second line, but different from the first pixel in the second line. This situation (i.e., where the last pixel in the first line is the same or similar to the last pixel in the second line, but different from the first pixel in the second line) may occur more frequently in computer generated screen content than other types of video content. In other words, for screen content, there may be a higher probability that pixels located at the same edge of a block having the same or similar values than pixels located at opposite edges of a block. Raster scanning may not take advantage of such a correlation.

In accordance with one or more techniques of this disclosure, palette-based encoding unit 122 may utilize a snake scan order when encoding the map. For instance, palette-based encoding unit 122 may encode the map such that the last pixel of the second line is scanned directly after the last pixel of the first line in the scan order. In this way, palette-based encoding unit 122 may improve the efficiency of run-length coding.

Palette-based encoding unit 122 may be configured to generate any of the various syntax elements described herein. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. A video encoder 20 may encode some blocks with inter-predictive temporal prediction or intra-predictive spatial coding modes and decode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

Figure 3:
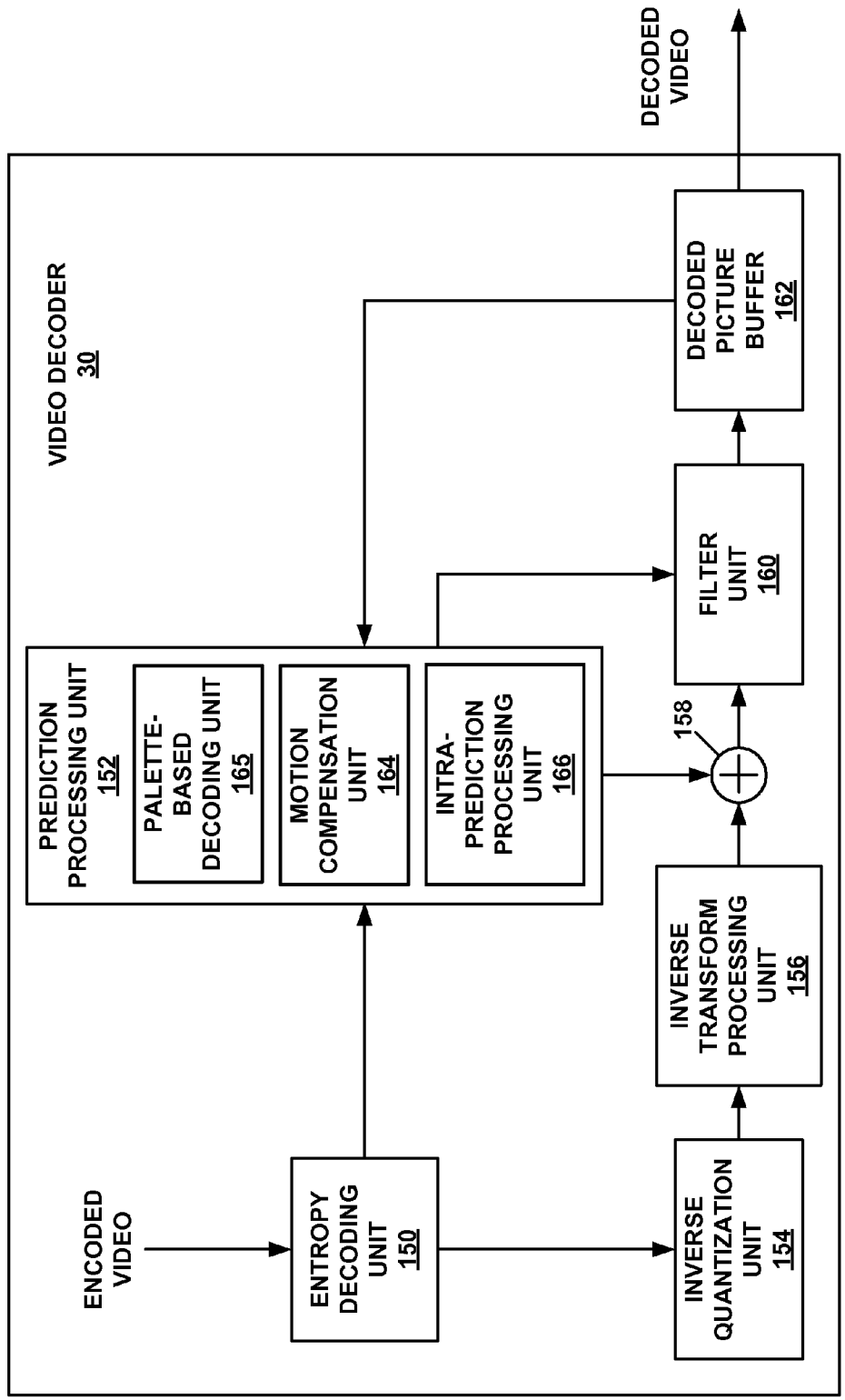
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 represents an example of a device that may be configured to perform techniques for palette-based video coding in accordance with various examples described in this disclosure. For example, video decoder 30 may be configured to selectively decode various blocks of video data, such as CU's or PU's in HEVC coding, using either palette-based coding or non-palette based coding. Non-palette based coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some positions of a block of video data with entries in the palette, select pixel values in the palette based on the information, and reconstruct pixel values of the block based on the selected pixel values.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configure to generate a palette having entries indicating pixel values, receive information associating at least some positions of a block of video data with entries in the palette, select pixel values in the palette based on the information, and reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

The palette coding mode information received by palette-based decoding unit 165 may comprise a palette mode syntax element, such as a flag. A first value of the palette mode syntax element indicates that the palette coding mode applies to the block and a second value of the palette mode syntax element indicates that the palette coding mode does not apply to the block of video data. Palette-based decoding unit 165 may receive (e.g., from video encoder 20) the palette coding mode information at one or more of a predictive unit level, a coding unit level, a slice level, or a picture level, or may receive an indication of whether palette coding mode is enabled in at least one of picture parameter set (PPS), sequence parameter set (SPS) or video parameter set (VPS).

In some examples, palette-based decoding unit 165 may infer the palette coding mode information based on one or more of a size of the coding block, a frame type, a color space, a color component, a frame size, a frame rate, a layer id in scalable video coding or a view id in multi-view coding associated with the block of video data.

Palette-based decoding unit 165 also may be configured to receive information defining at least some of the entries in the palette with video data, and generate the palette based at least in part on the received information. The size of the palette may be fixed or variable. In some cases, the size of the palette is variable and is adjustable based on information signaled with the video data. The signaled information may specify whether an entry in the palette is a last entry in the palette. Also, in some cases, the palette may have a maximum size. The size of the palette or the maximum size of the palette may also be conditionally transmitted or inferred. The conditions may be the size of the CU, the frame type, the color space, the color component, the frame size, the frame rate, the layer id in scalable video coding or the view id in multi-view coding.

The palette may be a single palette including entries indicating pixel values for a luma component and chroma components of the block. In this case, each entry in the palette is a triple entry indicating pixel values for the luma component and two chroma components. Alternatively, the palette comprises a luma palette including entries indicating pixel values of a luma component of the block, and chroma palettes including entries indicating pixel values for respective chroma components of the block.

In some examples, palette-based decoding unit 165 may generate the palette by predicting the entries in the palette based on previously processed data. The previously processed data may include palettes, or information from palettes, for previously decoded neighboring blocks. Palette-based decoding unit 165 may receive a prediction syntax element indicating whether the entries in the palette are to be predicted. The prediction syntax element may include a plurality of prediction syntax elements indicating, respectively, whether entries in palettes for luma and chroma components are to be predicted.

With respect to a predictive palette, for example, a predictive palette may contain palette entries from one or more neighboring blocks including spatially neighboring blocks and/or neighboring blocks in a particular scan order of the blocks. In an example, the neighboring blocks may be spatially located to the left (left neighboring block) of or above (upper neighboring block) the block currently being coded. In another example, palette-based decoding unit 165 may determine predictive palette entries using the most frequent sample values in a causal neighbor of the current block. In another example, the neighboring blocks may neighbor the block current being coded according to a particular scan order used to code the blocks. That is, the neighboring blocks may be one or more blocks coded prior to the current block in the scan order. Palette-based decoding unit 165 may decode one or more syntax elements to indicate the location of the neighboring blocks from which the palette(s) are copied.

Thus, in an example, palette-based decoding unit 165 may, in some examples, predict at least some of the entries in the palette based on entries in a palette for a left neighbor block or a top neighbor block in a slice or picture. In this case, the entries in the palette that are predicted based on entries in either a palette for the left neighbor block or the top neighbor block may be predicted by palette-based decoding unit 165 based on a syntax element that indicates selection of the left neighbor block or the top neighbor block for prediction. The syntax element may be a flag having a value that indicates selection of the left neighbor block or the top neighbor block for prediction.

In some examples, palette-based decoding unit 165 may receive one or more prediction syntax elements that indicate whether at least some selected entries in the palette, on an entry-by-entry basis, are to be predicted, and generate the entries accordingly. For example, palette-based decoding unit 165 may decode one or more syntax elements to indicate, for each entry of a predictive palette, whether the palette entry is included in the palette for the current block.

If an entry is not predicted, palette-based decoding unit 165 may decode one or more additional syntax elements to specify the non-predicted entries, as well as the number of such entries. Thus, palette-based decoding unit 165 may predict some of the entries and receive information directly specifying other entries in the palette including the number of additional entries.

In some examples, techniques for predicting an entire palette may be combined with techniques for predicting one or more entries of a palette. For example, palette-based decoding unit 165 may decode one or more syntax elements in a bitstream to indicate whether the current palette is entirely copied from the predictive palette. If this is not the case, palette-based decoding unit 165 may decode one or more syntax elements in a bitstream to indicate whether each entry in the predictive palette is copied.

In another example, instead of receiving the number of entries and the palette value, palette-based decoding unit 165 may receive, after each palette value, a flag to indicate whether the signaled palette value is the final palette entry for the palette. Palette-based decoding unit 165 may not receive such an "end of palette" flag if the palette has already reached a certain maximum size.

Information, received by palette-based decoding unit 165, associating at least some positions of a block of video data with entries in the palette may comprise map information that indicates palette index values for at least some of the positions in the block, wherein each of the palette index values corresponds to one of the entries in the palette. The map information may include one or more run syntax elements that each indicates a number of consecutive positions in the block having the same palette index value.

In some examples, palette-based decoding unit 165 may receive information indicating line copying whereby pixel or index values for a line of positions in the block are copied from pixel or index values for another line of positions in the block. Palette-based decoding unit 165 may use this information to perform line copying to determine pixel values or entries in the palette for various positions of a block. The line of positions may comprise a row, a portion of a row, a column or a portion of a column of positions of the block.

In some examples, palette-based decoding unit 165 may decode the palette index values indicated by the information that associates at least some positions of the block with entries in the palette in a particular order. For instance, the scan order used by palette-based decoding unit 165 to decode the palette index values may be the same scan order used by a palette-based encoding unit, such as palette-based encoding unit 122 of video encoder 20, to encode the palette index values. In some examples, palette-based decoding unit 165 may decode one or more syntax elements that specify the scan order used to code the palette index values.

For instance, as discussed above, the indices of a map may be scanned from top to bottom, left to right in what may be referred to as a raster scan order. In a raster scan order, the first index of a current line may be scanned directly after the last index of a previous line.

However, in some examples, scanning the indices in a raster scan order may not be efficient. For instance, where a first line of a block of video data includes a first pixel adjacent to a first edge of the block of video data and a last pixel adjacent to a second edge of the block of video data, a second line of the block of video data includes a first pixel adjacent to the first edge of the block of video data and a last pixel adjacent to the second edge of the block of video data, the last pixel of the first line is adjacent to the last pixel of the second line, and the first edge and the second edge are parallel, the last pixel in the first line is the same as the last pixel in the second line, but different from the first pixel in the second line. This situation (i.e., where the last pixel in the first line is the same or similar to the last pixel in the second line, but different from the first pixel in the second line) may occur more frequently in computer generated screen content than other types of video content. In other words, for screen content, there may be a higher probability that pixels located at the same edge of a block having the same or similar values than pixels located at opposite edges of a block. Raster scanning may not take advantage of such a correlation.

In accordance with one or more techniques of this disclosure, palette-based decoding unit 165 may utilize a snake scan order when decoding the map. For instance, palette-based decoding unit 165 may decode the map such that the last pixel of the second line is scanned directly after the last pixel of the first line in the scan order. In this way, palette-based decoding unit 165 may improve the efficiency of run-length coding.

Palette-based decoding unit 165 may generate the palette in part by receiving pixel values for one or more positions of the block, and adding the pixel values to entries in the palette to dynamically generate at least a portion of the palette on-the-fly. Adding the pixel values may comprise adding the pixel values to an initial palette comprising an initial set of entries, or to an empty palette that does not include an initial set of entries. In some examples, adding comprises adding the pixel values to add new entries to an initial palette comprising an initial set of entries or fill existing entries in the initial palette, or replacing or changing pixel values of entries in the initial palette.

In some examples, palette-based decoding unit 165 may determine a fixed, maximum size for a palette. Upon reaching the maximum size, palette-based decoding unit 165 may remove one or more entries of the palette. In one example, palette-based decoding unit 165 may remove the oldest entry of the palette, e.g., using a FIFO queue. After new entries are added into the queue, a pruning process may be applied to remove duplicated entries in the queue. In another example, palette-based decoding unit 165 may remove the least used entry. In still another example, palette-based decoding unit 165 may make a weighted determination regarding which entry to remove based on when a candidate entry to be removed was added to the palette and the relative usage of that entry.

In some examples, the palette may be a quantized palette in which a pixel value selected from the palette for one of the positions in the block is different from an actual pixel value of the position in the block, such that the decoding process is lossy. For example, the same pixel value may be selected from the palette for two different positions having different actual pixel values.

Figure 4:
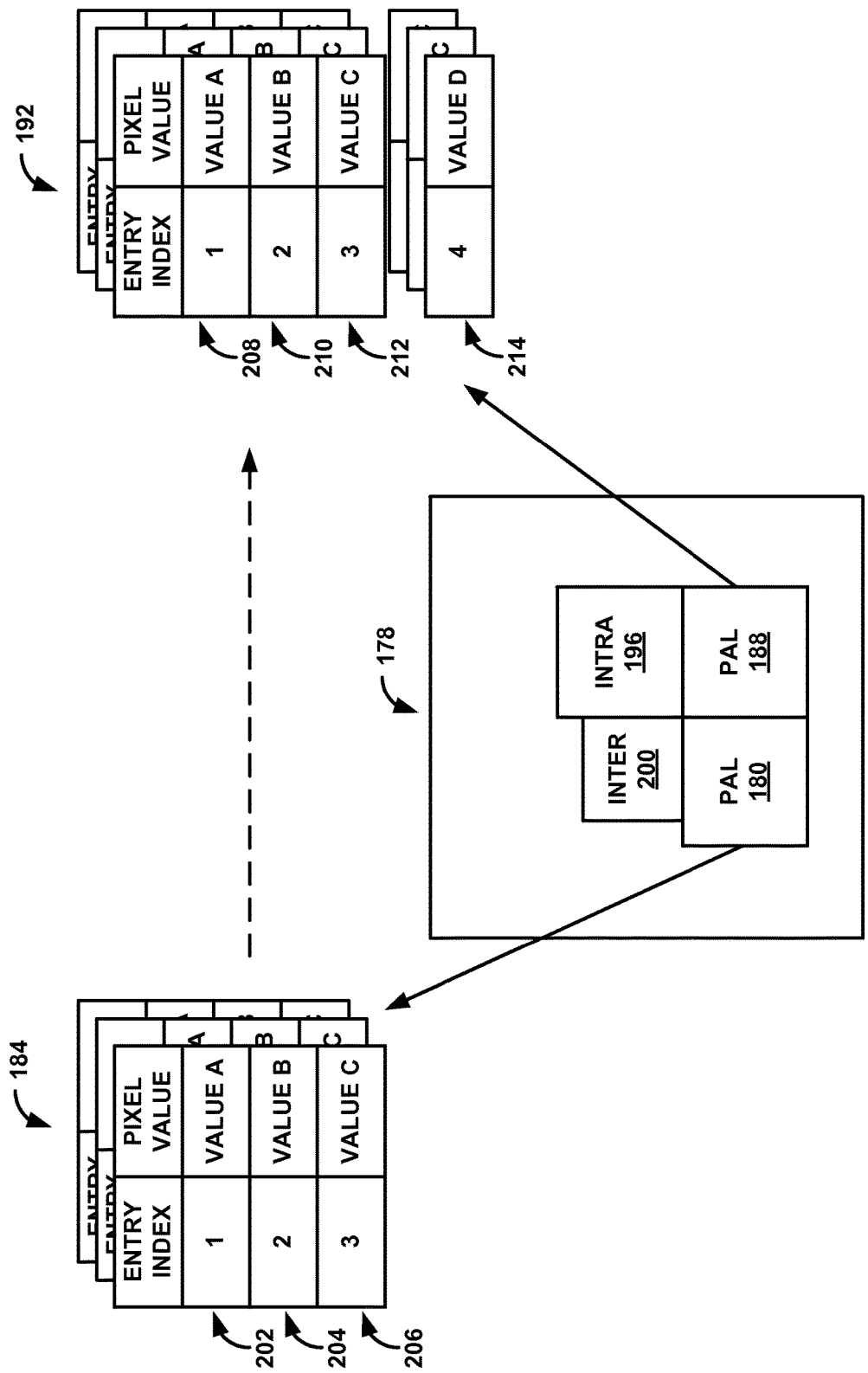
FIG. 4 is a conceptual diagram illustrating an example of determining a palette for coding video data, consistent with techniques of this disclosure.

FIG. 4 is a conceptual diagram illustrating an example of determining a palette for coding video data, consistent with techniques of this disclosure. The example of FIG. 4 includes a picture 178 having a first coding unit (CU) 180 that is associated with first palettes 184 and a second CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU. In another example, video encoder 20 may encode a palette for luma (Y) component of a CU, another palette for two components (U, V) of the CU. In this example, entries of the Y palette may represent Y values of pixels of the CU, entries of the U-V palette may represent U-V value pairs of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding. In general, one or more palettes may be transmitted for each CU or may be shared among different CUs.

Video encoder 20 and video decoder 30 may determine second palettes 192 based on first palettes 184. For example, video encoder 20 may encode a pred_palette_flag for each CU (including, as an example, second CU 188) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 30 may determine that second palettes 192 for second CU 188 are predicted from one or more already decoded palettes and therefore no new palettes for second CU 188 are included in a bitstream containing the pred_palette_flag. When such a flag is equal to zero, video decoder 30 may determine that palette 192 for second CU 188 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is a flag may be signaled for each entry of a palette predictor to indicate whether that entry is present in the current palette. As noted above, if a palette entry is not predicted, the palette entry may be explicitly signaled.

When determining second palettes 192 relative to first palettes 184 (e.g., pred_palette_flag is equal to one), video encoder 20 and/or video decoder 30 may locate one or more blocks from which the predictive palettes, in this example first palettes 184, are determined. The predictive palettes may be associated with one or more neighboring CUs of the CU currently being coded (e.g., such as neighboring CUs (spatially or based on scan order) or the most frequent samples of a causal neighbor), i.e., second CU 188. The palettes of the one or more neighboring CUs may be associated with a predictor palette. In some examples, such as the example illustrated in FIG. 4, video encoder 20 and/or video decoder 30 may locate a left neighboring CU, first CU 180, when determining a predictive palette for second CU 188. In other examples, video encoder 20 and/or video decoder 30 may locate one or more CUs in other positions relative to second CU 188, such as an upper CU, CU 196.

Video encoder 20 and/or video decoder 30 may determine a CU for palette prediction based on a hierarchy. For example, video encoder 20 and/or video decoder 30 may initially identify the left neighboring CU, first CU 180, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 20 and/or video decoder 30 may identify the upper neighboring CU, CU 196. Video encoder 20 and/or video decoder 30 may continue searching for an available CU according to a predetermined order of locations until locating a CU having a palette available for palette prediction. In some examples, video encoder 20 and/or video decoder 30 may determine a predictive palette based on multiple blocks and/or reconstructed samples of a neighboring block.

While the example of FIG. 4 illustrates first palettes 184 as predictive palettes from a single CU, first CU 180, in other examples, video encoder 20 and/or video decoder 30 may locate palettes for prediction from a combination of neighboring CUs. For example, video encoder 20 and/or video decoder may apply one or more formulas, functions, rules or the like to generate a palette based on palettes of one or a combination of a plurality of neighboring CUs.

In still other examples, video encoder 20 and/or video decoder 30 may construct a candidate list including a number of potential candidates for palette prediction. A pruning process may be applied at both video encoder 20 and video decoder 30 to remove duplicated candidates in the list. In such examples, video encoder 20 may encode an index to the candidate list to indicate the candidate CU in the list from which the current CU used for palette prediction is selected (e.g., copies the palette). Video decoder 30 may construct the candidate list in the same manner, decode the index, and use the decoded index to select the palette of the corresponding CU for use with the current CU.

In an example for purposes of illustration, video encoder 20 and video decoder 30 may construct a candidate list that includes one CU that is positioned above the CU currently being coded and one CU that is positioned to the left of the CU currently being coded. In this example, video encoder 20 may encode one or more syntax elements to indicate the candidate selection. For example, video encoder 20 may encode a flag having a value of zero to indicate that the palette for the current CU is copied from the CU positioned to the left of the current CU. Video encoder 20 may encode the flag having a value of one to indicate that the palette for the current CU is copied from the CU positioned above the current CU. Video decoder 30 decodes the flag and selects the appropriate CU for palette prediction.

In still other examples, video encoder 20 and/or video decoder 30 determine the palette for the CU currently being coded based on the frequency with which sample values included in one or more other palettes occur in one or more neighboring CUs. For example, video encoder 20 and/or video decoder 30 may track the colors associated with the most frequently used index values during coding of a predetermined number of CUs. Video encoder 20 and/or video decoder 30 may include the most frequently used colors in the palette for the CU currently being coded.

In some examples, video encoder 20 and/or video decoder 30 may perform entry-wise based palette prediction. For example, video encoder 20 may encode one or more syntax elements, such as one or more flags, for each entry of a predictive palette indicating whether the respective predictive palette entries are reused in the current palette (e.g., whether pixel values in a palette of another CU are reused by the current palette). In this example, video encoder 20 may encode a flag having a value equal to one for a given entry when the entry is a predicted value from a predictive palette (e.g., a corresponding entry of a palette associated with a neighboring CU). Video encoder 20 may encode a flag having a value equal to zero for a particular entry to indicate that the particular entry is not predicted from a palette of another CU. In this example, video encoder 20 may also encode additional data indicating the value of the non-predicted palette entry.

In the example of FIG. 4, second palettes 192 includes four entries 208-214 having entry index value 1, entry index value 2, entry index value 3, and entry index 4, respectively. Entries 208-214 relate the index values to pixel values including pixel value A, pixel value B, pixel value C, and pixel value D, respectively. Video encoder 20 and/or video decoder 30 may use any of the above-described techniques to locate first CU 180 for purposes of palette prediction and copy entries 1-3 of first palettes 184 to entries 1-3 of second palettes 192 for coding second CU 188. In this way, video encoder 20 and/or video decoder 30 may determine second palettes 192 based on first palettes 184. In addition, video encoder 20 and/or video decoder 30 may code data for entry 4 to be included with second palettes 192. Such information may include the number of palette entries not predicted from a predictor palette and the pixel values corresponding to those palette entries.

In some examples, according to aspects of this disclosure, one or more syntax elements may indicate whether palettes, such as second palettes 192, are predicted entirely from a predictive palette (shown in FIG. 4 as first palettes 184, but which may be composed of entries from one or more blocks) or whether particular entries of second palettes 192 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 192 are predicted from the predictive palette.

According to some aspects of this disclosure, certain information associated with palette prediction may be inferred from one or more characteristics of the data being coded. That is, rather than video encoder 20 encoding syntax elements (and video decoder 30 decoding such syntax elements) video encoder 20 and video decoder 30 may perform palette prediction based on one or more characteristics of the data being coded.

Figure 5:
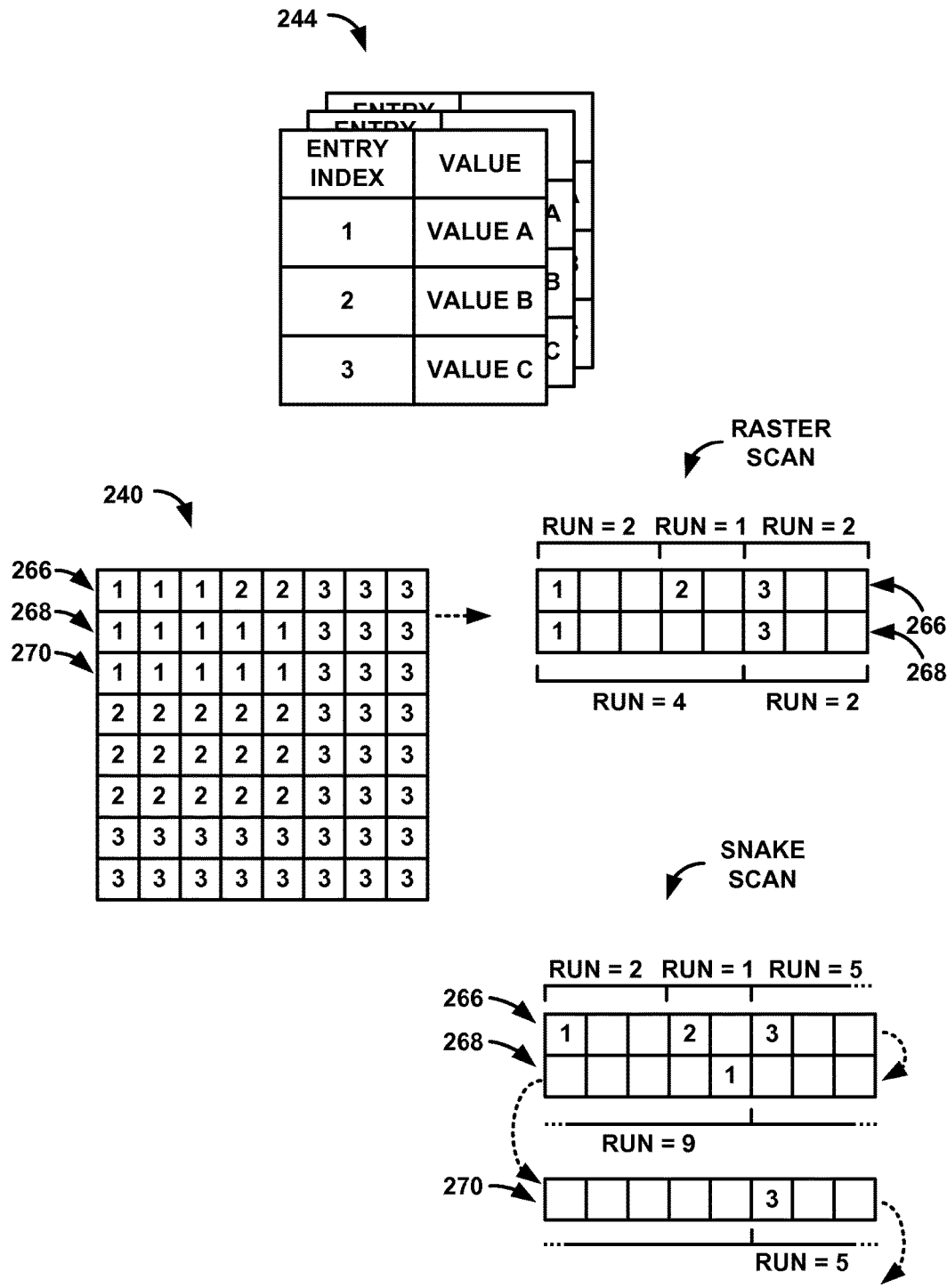
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of index values (values 1, 2, and 3) that relate respective positions of pixels associated with the index values to an entry of palettes 244. Palettes 244 may be determined in a similar manner as first palettes 184 and second palettes 192 described above with respect to FIG. 4.

Again, the techniques of FIG. 5 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

While map 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated with index values. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244. Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

Figure 6A:
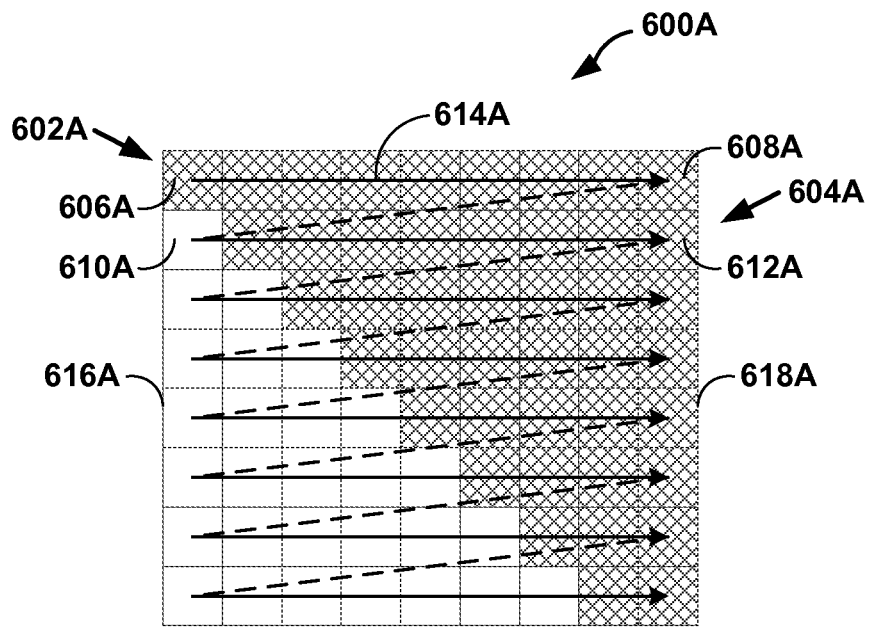
FIGS. 6A and 6B are conceptual diagrams illustrating example scan orders, consistent with techniques of this disclosure.

The number of indices that may be included in a run may be impacted by the scan order. For example, consider a raster scan of lines 266, 268, and 270 of map 240. Assuming a horizontal, left to right scan direction (such as the raster scanning order as illustrated in FIG. 6A), row 266 includes three index values of "1," two index values of "2," and three index values of "3." Row 268 includes five index values of "1" and three index values of "3." In this example, for row 266, video encoder 20 may encode syntax elements indicating that the first value of row 266 (the leftmost value of the row) is 1 with a run of 2, followed by an index value of 2 with a run of 1, followed by an index value of 3 with a run of 2. Following the raster scan, video encoder 20 may then begin coding row 268 with the leftmost value. For example, video encoder 20 may encode syntax elements indicating that the first value of row 268 is 1 with a run of 4, followed by an index value of 3 with a run of 2. Video encoder 20 may proceed in the same manner with line 270.

Hence, in the raster scan order, the first index of a current line may be scanned directly after the last index of a previous line. However, in some examples, it may not be desirable to scan the indices in a raster scan order. For instance, it may not be desirable to scan the indices in a raster scan order where a first line of a block of video data (e.g., row 266) includes a first pixel adjacent to a first edge of the block of video data (e.g., the left most pixel of row 266, which has an index value of 1) and a last pixel adjacent to a second edge of the block of video data (e.g., the right most pixel of row 266, which has an index value of 3), a second line of the block of video data (e.g., row 268) includes a first pixel adjacent to the first edge of the block of video data (e.g., the left most pixel of row 268, which has an index value of 1) and a last pixel adjacent to the second edge of the block of video data (e.g., the right most pixel of row 268, which has an index value of 3), the last pixel of the first line is adjacent to the last pixel of the second line, and the first edge and the second edge are parallel, the last pixel in the first line has the same index value as the last pixel in the second line, but has a different index value from the first pixel in the second line. This situation (i.e., where the index value of last pixel in the first line is the same as the last pixel in the second line, but different from the first pixel in the second line) may occur more frequently in computer generated screen content than other types of video content.

In accordance with one or more techniques of this disclosure, video encoder 20 may utilize a snake scan order when encoding the indices of the map. For instance, video encoder 20 may scan the last pixel of the second line directly after the last pixel of the first line. In this way, video encoder 20 may improve the efficiency of run-length coding.

Figure 6B:
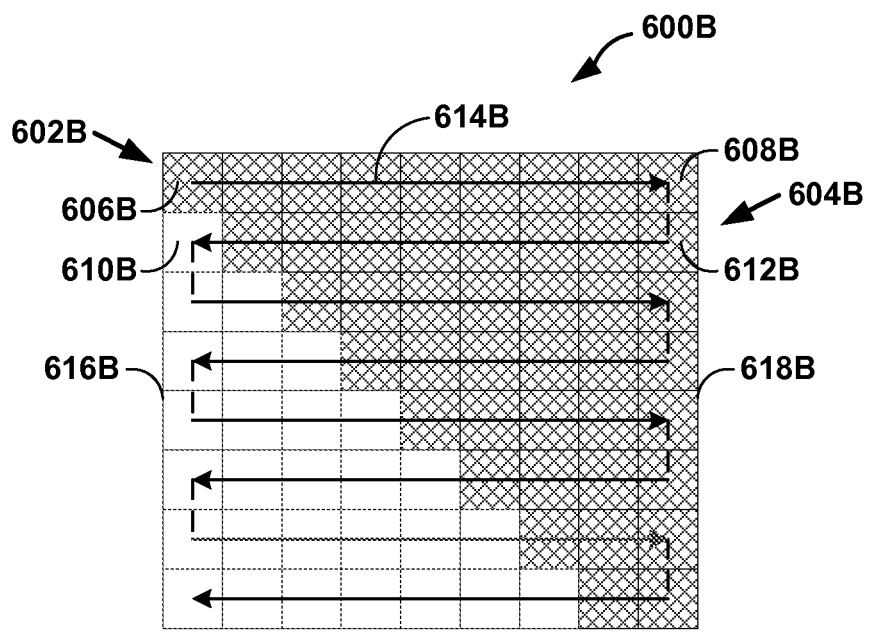

For example, in accordance with one or more techniques of this disclosure, as opposed to using a raster scan order, video encoder 20 may use a snake scan order to code the values of map 240. In an example for purposes of illustration, consider rows 266, 268, and 270 of map 240. Using a snake scan order (such as the snake scanning order as illustrated in FIG. 6B), video encoder 20 may code the values of map 240 beginning with the left position of row 266, proceeding through to the right most position of row 266, moving down to the left most position of row 268, proceeding through to the left most position of row 268, and moving down to the left most position of row 270. For instance, video encoder 20 may encode one or more syntax elements indicating that the first position of row 266 is one and that the next run of two consecutive entries in the scan direction are the same as the first position of row 266. Video encoder 20 may encode one or more syntax elements indicating that the next position of row 266 (i.e., the fourth position, from left to right) is two and that the next consecutive entry in the scan direction are the same as the fourth position of row 266. Video encoder 20 may encode one or more syntax elements indicating that the next position of row 266 (i.e., the sixth position) is three and that the next run of five consecutive entries in the scan direction are the same as the sixth position of row 266. Video encoder 20 may encode one or more syntax elements indicating that the next position in the scan direction (i.e., the fourth position of row 268, from right to left) of row 268 is one and that the next run of nine consecutive entries in the scan direction are the same as the fourth position of row 268.

In this way, by using a snake scan order, video encoder 20 may encode longer length runs, which may improve coding efficiency. For example, using the raster scan, the final run of row 266 (for the index value 3) is equal to 2. Using the snake scan, however, the final run of row 266 extends into row 268 and is equal to 5.

Video decoder 30 may receive the syntax elements described above and reconstruct rows 266, 268, and 270. For example, video decoder 30 may obtain, from an encoded bitstream, data indicating an index value for a position of map 240 currently being coded. Video decoder 30 may also obtain data indicating the number of consecutive positions in the scan order having the same index value.

FIGS. 6A and 6B are conceptual diagrams illustrating example scan orders, consistent with techniques of this disclosure. As illustrated in FIG. 6A, block 600A may include first line 602A that includes first pixel 606A and last pixel 608A, second line 604A that includes first pixel 610A and last pixel 612A, and scan order 614A. As illustrated in FIG. 6B, block 600B may include first line 602B that includes first pixel 606B and last pixel 608B, second line 604B that includes first pixel 610B and last pixel 612B, and scan order 614B. As illustrated in FIG. 6A, first pixel 606A and first pixel 610A may be adjacent to first edge 616A, last pixel 608A and last pixel 612A may be adjacent to second edge 618A, and first edge 616A may be parallel to second edge 618A. Similarly, first pixel 606B and first pixel 610B may be adjacent to first edge 616B, last pixel 608B and last pixel 612B may be adjacent to second edge 618B, and first edge 616B may be parallel to second edge 618B.

Scan order 614A of FIG. 6A may be referred to as a raster scan order, because first value 610A in second line 604A is scanned directly after last value 608A in previous line 602A. Scan order 614B of FIG. 6B may be referred to as a snake scan order in which first value 610B in second line 604B is scanned directly after last value 608B in previous line 602B.

In accordance with one or more techniques of this disclosure, as opposed to scanning pixels using a raster scan order (e.g., scan order 614A), a video coder (e.g., video encoder 20 or video decoder 30) may scan pixels using a snake scan order (e.g., scan order 614B) when performing palette mode video coding.

Figure 7A:
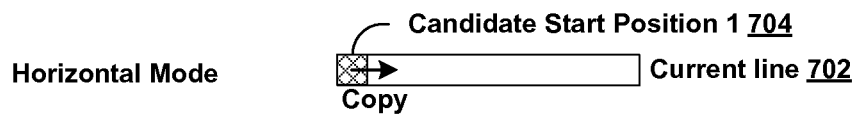
FIGS. 7A-7C are conceptual diagrams illustrating example modes of palette based video coding, consistent with techniques of this disclosure.
Figure 7B:
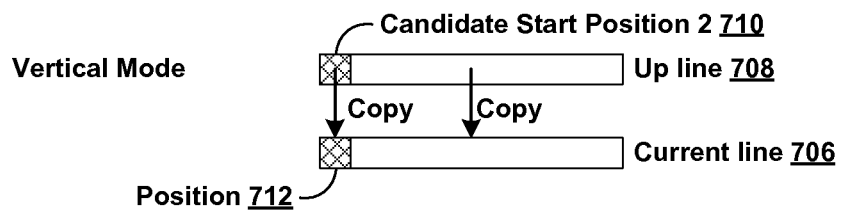
Figure 7C:
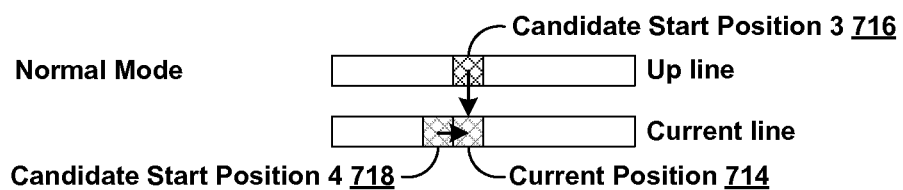

FIGS. 7A-7C are conceptual diagrams illustrating example modes of palette based video coding, consistent with techniques of this disclosure. As discussed above, the first method described by JCTVC-P0035 to code indices of a map relative to one or more other indices of the map provides for three coding modes, a horizontal mode, a vertical mode, and a normal mode.

When coding indices using the horizontal mode, all of the index values of the current line may be the same (i.e., the whole line may share the same color index). As such, in horizontal mode, a video encoder may encode a single index for an entire row. As illustrated by FIG. 7A, a video decoder may copy the index at candidate start position 1 702 (i.e., having index value 0) across current line 700 (i.e., such that the index values for all pixels of current line 700 are decoded as 0).

When coding indices using the vertical mode, the indices of the current line may be the same as the indices of the up line (i.e., the whole line may be the same with the above line). In this case, the video decoder may copy the indices from the up line to the current line. As illustrated by FIG. 7B, a video decoder may copy the indices of up line 706 to current line 704 (i.e., such that the indices of current line 704 are the same as the indices of up line 706). For instance, the video decoder may copy the index value from candidate start position 2 710 to position 712.

When coding indices using the normal mode, a video coder may code a flag for each respective pixel position that indicates whether the index for the respective pixel position is the same as an index for a pixel position to the left of the respective pixel position or the same as an index for a pixel position above the respective pixel position. If the index for the respective pixel position is not the same as the index for the pixel position to the left of or the index for the pixel position above the respective pixel position, the video coder may code the index for the respective pixel position. As illustrated by FIG. 7C, a video coder may code a flag for current position 714 that indicates whether or not the color index of candidate start position 3 716 (i.e., the index of the pixel position above current position 714) or the color index of candidate start position 4 718 (i.e., the index of the pixel position to the left of current position 714) should be copied to current position 714.

Figure 8A:
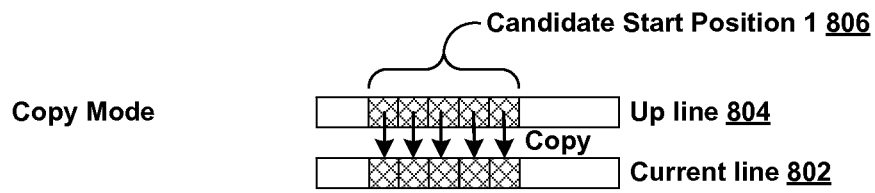
FIGS. 8A-8C are conceptual diagrams illustrating example modes of palette based video coding, consistent with techniques of this disclosure.
Figure 8B:
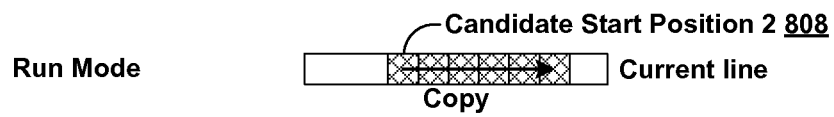
Figure 8C:
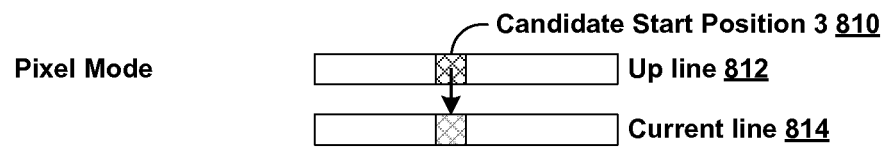

FIGS. 8A-8C are conceptual diagrams illustrating example modes of palette based video coding, consistent with techniques of this disclosure. As discussed above, the second method described by JCTVC-P0035 to code indices of a map relative to one or more other indices of the map provides for three coding modes, a "Copy above mode," a "Run Mode," and a "Pixel mode."

In the "copy above mode," a video coder may code a value "copy_run" (N) that indicates that the following N palette indexes are the same as their above neighbors, respectively. As illustrated by FIG. 8A, a video coder may code a copy_run value of five to indicate that the following five palette indexes of current line 802 are the same as their above neighbors from up line 804 (i.e., the five positions indicated by candidate start position 1 806), respectively. As another example, in FIG. 8A, a video coder may code a copy_run value of four (4) to indicate that the following five (5) palette indexes of current line 802 are the same as their above neighbors from up line 804.

In the "run mode," a video coder may code a palette index followed by "palette_run" (M) that indicates that the following M palette indexes are the same as the signaled palette index. As illustrated by FIG. 8B, a video coder may code a palette index for candidate start position 2 808 and a palette_run with a value of five which indicates that the index values following five positions are the same as the index value for candidate start position 2 808.

In the "pixel mode," a video coder may code a prediction flag. The video coder may code the flag as 1 to indicate that the value of a current pixel is coded using prediction residual with the reconstructed top neighboring pixel as the predictor. The video coder may code the flag as 0 to indicate that the pixel value may is transmitted without prediction. As illustrated by FIG. 8C, if the prediction flag is 1, a video coder may copy the pixel value for candidate Start Position 3 810 in up line 812 to the corresponding position in the current line 814.

Figure 9:
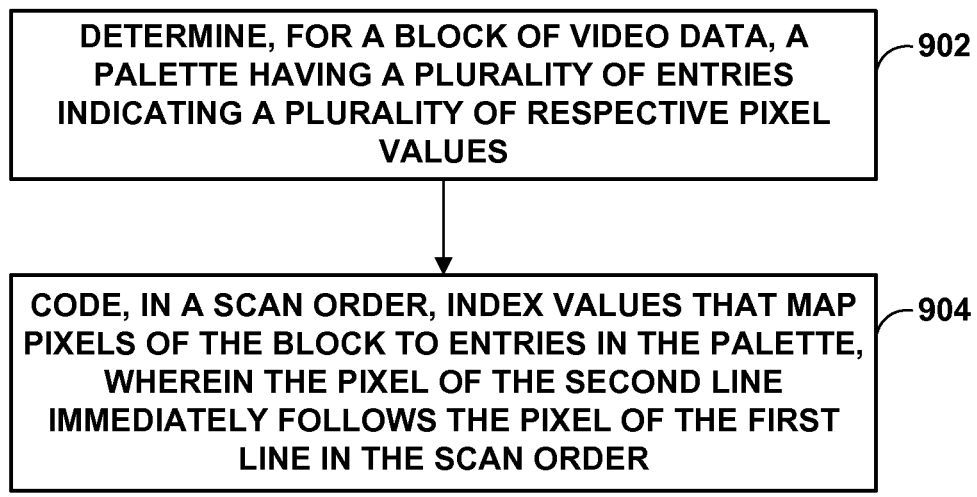
FIG. 9 is a flowchart illustrating an example process for coding video data using a palette coding mode, consistent with techniques of this disclosure.

FIG. 9 is a flowchart illustrating an example process for coding video data using a palette coding mode, consistent with techniques of this disclosure. The method of FIG. 9 is explained with respect to a video coder, such as video encoder 20 (FIGS. 1 and 2) or video decoder 30 (FIGS. 1 and 3). However, it should be understood that other video coding devices may be configured to perform a similar method. Moreover, certain steps in the method may be performed in a different order or in parallel. Likewise, certain steps may be omitted, and other steps may be added, in various examples.

A video coder, such as video encoder and/or video decoder 30 may determine, for a block of video data, a palette having a plurality of entries indicating a plurality of respective pixel values (902). In some examples, a first line of the block of video data (e.g., first line 602B of FIG. 6B) may include a first pixel (e.g., first pixel 606B of FIG. 6B) adjacent to a first edge of the block of video data (e.g., first edge 616B of FIG. 6B) and a last pixel (e.g., last pixel 608B of FIG. 6B) adjacent to a second edge of the block of video data (e.g., second edge 618B of FIG. 6B), a second line of the block of video data (e.g., second line 604B of FIG. 6B) may include a first pixel (e.g., first pixel 610B of FIG. 6B) adjacent to the first edge of the block of video data and a last pixel (e.g., last pixel 612B of FIG. 6B) adjacent to the second edge of the block of video data. In some examples, the last pixel of the first line may be adjacent to the last pixel of the second line. In some examples, the first edge may be parallel to the second edge.

The video coder may code, in a scan order, index values that map pixels of the block to entries in the palette, wherein the pixel of the second line immediately follows the pixel of the first line in the scan order (904). For instance, video encoder 20 may encode syntax elements to represent a map of index values (e.g., map 240 of FIG. 5) that relate respective positions of pixels of the block of video data associated with the index values to an entry of palettes using a snake scan order (e.g., as illustrated in FIG. 6B).

In some examples, such as the example of FIG. 6B, the first line may be a first row and the second line may be a second row. In some examples, the first line may be a first column and the second line may be a second column (e.g., if the example of FIG. 6B were rotated 90 degrees).

In some examples, the video coder may code a syntax element that indicates that the last pixel of the second line is directly after the last pixel of the first line in the scan order.

For instance, the video coder may code a syntax element that indicates a snake scan order. Additionally or alternatively, video coder may signal or infer the scan order based on so-called side information such as, for example, block size, color space, and/or color component.

In some examples, each entry in the palette may respectively include a unique index value. In such examples, the video coder may code the index values and/or coding one or more escape pixels. In some examples, the video coder may code one or both of the index value and escape pixels using truncated binary code.

In some examples, such as where the method of FIG. 9 is performed by a video encoder, the video encoder may generate the palette. For instance, the video encoder may generate the palette in accordance with the techniques of FIG. 10.

Figure 10:
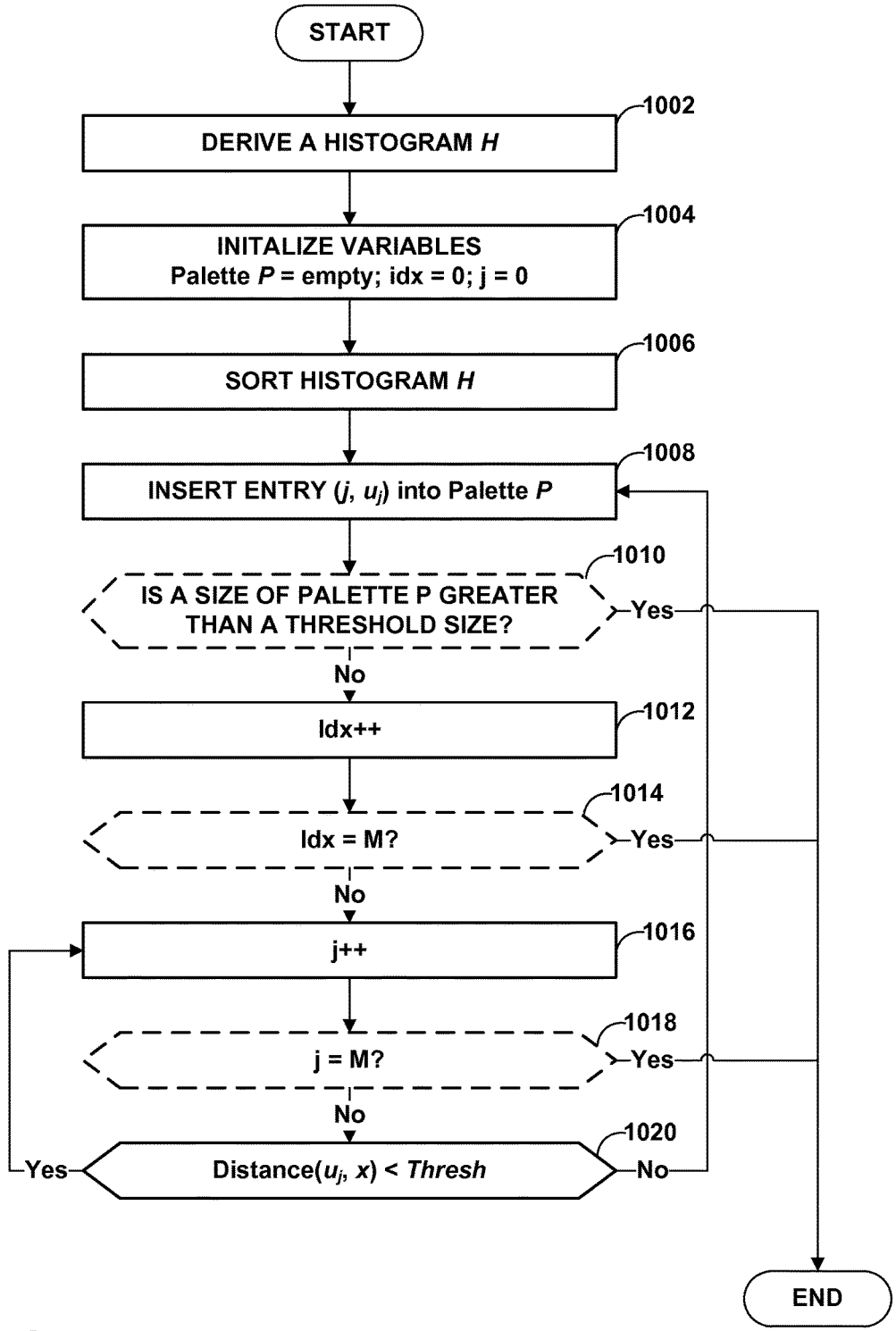
FIG. 10 is a flowchart illustrating an example process for determining a palette for a block of video data, consistent with techniques of this disclosure.

FIG. 10 is a flowchart illustrating an example process for determining a palette for a block of video data, consistent with techniques of this disclosure. The techniques of FIG. 10 may be performed by a video coder, such as video encoder 20 illustrated in FIG. 1 and FIG. 2. For purposes of illustration, the techniques of FIG. 10 are described within the context of video encoder 20 of FIG. 1 and FIG. 2, although video coders having configurations different than that of video encoder 20 may perform the techniques of FIG. 10.

A video encoder, such as video encoder 20, may generate a palette for a block of video data. For instance, video encoder 20 may derive a histogram including a plurality of entries that each include a respective pixel value and a respective quantity of pixels with pixel values similar to the respective pixel value. As one example, palette-based encoding unit (PBEU) 122 of video encoder 20 may determine a histogram H for a block of video data (1002). Histogram H may be represented by $H=\{(v_i, f_i)=\{0, 1, 2, \ldots, M\}\}$ where M+1 is the number of different pixel values in the current block, $v_i$ is pixel value, $f_i$ is the number of occurrences of $v_i$ (i.e., how many pixels in the current block have pixel value $v_i$). In some examples, each of the plurality of entries of the histogram represents a quantity of pixels that have the same pixel value. In some examples, each of the plurality of entries of the histogram represents a quantity of pixels that, when quantized, have the same pixel value.

In some examples, the video encoder may classify, based on the histogram, one or more pixels of the block of video data as major color pixels or escape pixels (which may correspond to entries in the histogram that indicate a lower quantity of pixels than pixels classified as major color pixels). In some examples, the video code may code actual value for pixels classified as escape pixels (i.e., as opposed to coding index values). The actual values for the escape pixels may be quantized or not quantized.

PBEU 122 may initialize one or more variables (1004). For instance, PBEU 122 may initialize palette P to empty, an index of palette (idx) P to 0, and/or an index of histogram H (j) to zero.

PBEU 122 may sort histogram H (1006). For instance, PBEU 122 may sort histogram H according to the descending order of $f_i$, such that pixels having more occurrences are placed nearing the front. The sorted histogram may be represented by $H_o=\{(u_i, f_i), i=\{0, 1, 2, \ldots, M\}, f_i \geq f_{i+1}\}$.

PBEU 122 may insert an entry into palette P (1008). For instance, PBEU 122 may copy entry (j, $u_j$) from sorted histogram $H_o$ into palette P.

PBEU 122 may increment the palette index (1012) and the histogram index (1016). PBEU 122 may determine whether or not the pixel value corresponding to the next entry in the sorted histogram $H_o$ is within the neighborhood of any of the pixel values already included in the palette (1020). For instance, PBEU 122 may determine a distance value that corresponds to a difference between the pixel value corresponding to the next entry in the sorted histogram $H_o$ and one or more of the pixel values already included in the palette. If the determined difference value satisfies a threshold, PBEU 122 may insert an entry into palette P that includes the pixel value corresponding to the next entry ("No" branch of 1020, 1008). If the determined difference value does not satisfy the threshold, PBEU 122 may increment the histogram index ("Yes" branch of 1020, 1016).

In some examples, PBEU 122 may stop determining the palette if one or more conditions satisfy one or more respective thresholds. As one example, PBEU 122 may stop determining the palette where the size of palette P is greater than a threshold size ("Yes" branch of 1010). As another example, PBEU 122 may stop determining the palette where the value of the palette index (idx) equals a threshold (M) ("Yes" branch of 1014). As another example, PBEU 122 may stop determining the palette where the value of the histogram index (j) equals a threshold (M) ("Yes" branch of 1018). In some examples, M may correspond to the number of different pixel values in the current block.

The following numbered examples may illustrate one or more aspects of the disclosure:

Example 1

A method of coding video data, the method comprising: determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and adjacent to the pixel of the first line; and coding, in a scan order, index values that map pixels of the block to entries in the palette, wherein the pixel of the second line immediately follows the pixel of the first line in the scan order.

Example 2

The method of example 1, wherein the first line is a first row and the second line is a second row, and wherein coding the index values in the scan order comprises coding an index value for the pixel in the first row immediately before coding an index value for the pixel in the second row.

Example 3

The method of example 1, wherein the first line is a first column and the second line is a second column, and wherein coding the index values in the scan order comprises coding an index value for the pixel in the first column immediately before coding an index value for the pixel in the second column.

Example 4

The method of any combination of examples 1-3, wherein the edge is a first edge, wherein the pixel of the second line is a first pixel of the second line, wherein the second line includes a second pixel located adjacent to a second edge of the block of video data that is parallel to the first edge, and wherein coding the index values comprises: coding one or more syntax elements indicating a run of consecutive pixels in the scan order have the same index value, wherein the run of consecutive pixels includes the pixel of the first line and the first pixel of the second line, and does not include the second pixel of the second line.

Example 5

The method of any combination of examples 1-4, further comprising: coding a syntax element that indicates that the pixel of the second line is scanned in the scan order immediately after the pixel of the first line.

Example 6

The method of any combination of examples 1-5, wherein each entry in the palette respectively includes a unique index value that corresponds to a respective color value of the plurality of respective color values, the method further comprising: coding values for escape pixels that do not correspond to respective color values of the plurality of respective color values, wherein coding the index values and the escape pixels includes coding one or both of the index values and the escape pixels using truncated binary code.

Example 7

The method of any combination of examples 1-6, wherein the video coder is a video encoder, wherein coding the index values comprises encoding the index values, the method further comprising generating a bitstream that includes the palette and one or more syntax elements that represent the index values.

Example 8

The method of any combination of examples 1-7, further comprising: determining, for the block of video data, a histogram including a plurality of entries that each include a respective pixel value and a respective quantity of pixels with pixel values similar to the respective pixel value; classifying, based on the histogram, one or more pixels of the block of video data as major color pixels or escape pixels, wherein pixels classified as escape pixels correspond to entries in the histogram that indicate a lower quantity of pixels than pixels classified as major color pixels; and determining the palette based on the histogram.

Example 9

The method of any combination of examples 1-8, wherein each of the plurality of entries of the histogram represents a quantity of pixels that, when quantized, have the same pixel value.

Example 10

The method of any combination of examples 1-9, wherein determining the palette comprises: determining a first entry of the palette for the block of video data, wherein the first entry corresponds to a first entry of the histogram; determining a distance value that corresponds to a difference between a pixel value included in a second entry of the histogram and one or more pixel values included in the palette; and responsive to determining that the distance value satisfies a threshold, copying the pixel value included in the second entry of the histogram into a second entry of the palette.

Example 11

The method of any combination of examples 1-10, wherein the threshold is based on a quantization parameter (QP) of the block of video data.

Example 12

The method of any combination of examples 1-11, wherein the video coder is a video decoder, wherein coding the index values comprises decoding the index values, the method further comprising receiving a bitstream that includes the palette and one or more syntax elements that represent the index values.

Example 13

An apparatus for coding video data, the apparatus comprising: a memory configured to store a block of video data; and one or more processors configured to perform the method of any combination of examples 1-12.

Example 14

An apparatus for coding video data, the apparatus comprising: means for performing the method of any combination of examples 1-12.

Example 15

A computer-readable medium storing instructions thereon that, when executed, cause one or more processors of a video coder to perform the method of any combination of examples 1-12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and immediately adjacent to the pixel of the first line; and
   coding, in a snake scan order, index values that map pixels of the block to entries in the palette, wherein the pixel of the second line immediately follows the pixel of the first line in the snake scan order.

2. The method of claim 1, wherein the first line is a first row and the second line is a second row, and wherein coding the index values in the snake scan order comprises coding an index value for the pixel in the first row immediately before coding an index value for the pixel in the second row.

3. The method of claim 1, wherein the first line is a first column and the second line is a second column, and wherein coding the index values in the snake scan order comprises coding an index value for the pixel in the first column immediately before coding an index value for the pixel in the second column.

4. The method of claim 1, wherein the edge is a first edge, wherein the pixel of the second line is a first pixel of the second line, wherein the second line includes a second pixel located adjacent to a second edge of the block of video data that is parallel to the first edge, and wherein coding the index values comprises:
   coding one or more syntax elements indicating a run of consecutive pixels in the snake scan order have the same index value, wherein the run of consecutive pixels includes the pixel of the first line and the first pixel of the second line, and does not include the second pixel of the second line.

5. The method of claim 1, further comprising:
   coding a syntax element that indicates that the pixel of the second line is scanned in the snake scan order immediately after the pixel of the first line.

6. The method of claim 1, wherein each entry in the palette respectively includes a unique index value that corresponds to a respective color value of the plurality of respective color values, the method further comprising:
   coding values for escape pixels that do not correspond to respective color values of the plurality of respective color values,
   wherein coding the index values and the escape pixels includes coding one or both of the index values and the escape pixels using truncated binary code.

7. The method of claim 1, wherein the video coder is a video encoder, wherein coding the index values comprises encoding the index values, the method further comprising generating a bitstream that includes the palette and one or more syntax elements that represent the index values.

8. The method of claim 7, further comprising:
   determining, for the block of video data, a histogram including a plurality of entries that each include a respective pixel value and a respective quantity of pixels with pixel values similar to the respective pixel value;
   classifying, based on the histogram, one or more pixels of the block of video data as major color pixels or escape pixels, wherein pixels classified as escape pixels correspond to entries in the histogram that indicate a lower quantity of pixels than pixels classified as major color pixels; and
   determining the palette based on the histogram.

9. The method of claim 8, wherein each of the plurality of entries of the histogram represents a quantity of pixels that, when quantized, have the same pixel value.

10. The method of claim 8, wherein determining the palette comprises:
    determining a first entry of the palette for the block of video data, wherein the first entry corresponds to a first entry of the histogram;
    determining a distance value that corresponds to a difference between a pixel value included in a second entry of the histogram and one or more pixel values included in the palette; and
    responsive to determining that the distance value satisfies a threshold, copying the pixel value included in the second entry of the histogram into a second entry of the palette.

11. The method of claim 10, wherein the threshold is based on a quantization parameter (QP) of the block of video data.

12. The method of claim 1, wherein the video coder is a video decoder, wherein coding the index values comprises decoding the index values, the method further comprising receiving a bitstream that includes the palette and one or more syntax elements that represent the index values.

13. An apparatus for coding video data, the apparatus comprising:
    a memory configured to store a block of video data; and
    one or more processors configured to:
      determine for the block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and immediately adjacent to the pixel of the first line; and
      code, in a snake scan order, index values that map pixels of the block to entries in the palette, wherein the pixel of the second line immediately follows the pixel of the first line in the snake scan order.

14. The apparatus of claim 13, wherein the first line is a first row and the second line is a second row, and wherein, to code the index values in the snake scan order, the one or more processors are configured to code an index value for the pixel in the first row immediately before coding an index value for the pixel in the second row.

15. The apparatus of claim 13, wherein the first line is a first column and the second line is a second column, and wherein, to code the index values in the snake scan order, the one or more processors are configured to code an index value for the pixel in the first column immediately before coding an index value for the pixel in the second column.

16. The apparatus of claim 13, wherein the edge is a first edge, wherein the pixel of the second line is a first pixel of the second line, wherein the second line includes a second pixel located adjacent to a second edge of the block of video data that is parallel to the first edge, and wherein, to code the index values, the one or more processors are configured to:
  code one or more syntax elements indicating a run of consecutive pixels in the snake scan order have the same index value, wherein the run of consecutive pixels includes the pixel of the first line and the first pixel of the second line, and does not include the second pixel of the second line.

17. The apparatus of claim 13, wherein the one or more processors are further configured to:
  code a syntax element that indicates that the pixel of the second line is scanned in the snake scan order immediately after the pixel of the first line.

18. The apparatus of claim 13, wherein each entry in the palette respectively includes a unique index value that corresponds to a respective color value of the plurality of respective color values, and wherein the one or more processors are further configured to:
  code values for escape pixels that do not correspond to respective color values of the plurality of respective color values,
  wherein the one or more processors are configured to code one or both of the index values and the escape pixels using truncated binary code.

19. The apparatus of claim 13, further comprising a video encoder, wherein, to code the index values, the one or more processors are configured to encode the index values, and wherein the one or more processors are further configured to generate a bitstream that includes the palette and one or more syntax elements that represent the index values.

20. The apparatus of claim 19, wherein the one or more processors are further configured to:
  determine, for the block of video data, a histogram including a plurality of entries that each include a respective pixel value and a respective quantity of pixels with pixel values similar to the respective pixel value;
  classify, based on the histogram, one or more pixels of the block of video data as major color pixels or escape pixels, wherein pixels classified as escape pixels correspond to entries in the histogram that indicate a lower quantity of pixels than pixels classified as major color pixels; and
  determine the palette based on the histogram.

21. The apparatus of claim 20, wherein each of the plurality of entries of the histogram represents a quantity of pixels that, when quantized, have the same pixel value.

22. The apparatus of claim 20, wherein, to determine the palette, the one or more processors are configured to:
  determine a first entry of the palette for the block of video data, wherein the first entry corresponds to a first entry of the histogram;
  determine a distance value that corresponds to a difference between a pixel value included in a second entry of the histogram and one or more pixel values included in the palette; and
  responsive to determining that the distance value satisfies a threshold, copy the pixel value included in the second entry of the histogram into a second entry of the palette.

23. The apparatus of claim 22, wherein the threshold is based on a quantization parameter (QP) of the block of video data.

24. The apparatus of claim 13, further comprising a video decoder, wherein, to code the index values, the one or more processors are configured to decode the index values, and wherein the one or more processors are further configured to receive a bitstream that includes the palette and one or more syntax elements that represent the index values.

25. An apparatus for coding video data, the apparatus comprising:
  means for determining, by a video coder and for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and immediately adjacent to the pixel of the first line; and
  means for coding, in a snake scan order, index values that map pixels of the block to entries in the palette, wherein the pixel of the second line immediately follows the pixel of the first line in the snake scan order.

26. The apparatus of claim 25, wherein the first line is a first row and the second line is a second row, and wherein the means for coding the index values in the snake scan order comprise means for coding an index value for the pixel in the first row immediately before coding an index value for the pixel in the second row.

27. The apparatus of claim 25, wherein the first line is a first column and the second line is a second column, and wherein the means for coding the index values in the snake scan order comprise means for coding an index value for the pixel in the first column immediately before coding an index value for the pixel in the second column.

28. The apparatus of claim 25, wherein the edge is a first edge, wherein the pixel of the second line is a first pixel of the second line, wherein the second line includes a second pixel located adjacent to a second edge of the block of video data that is parallel to the first edge, and wherein the means for coding the index values comprise:
  means for coding one or more syntax elements indicating a run of consecutive pixels in the snake scan order have the same index value, wherein the run of consecutive pixels includes the pixel of the first line and the first pixel of the second line, and does not include the second pixel of the second line.

29. The apparatus of claim 25, further comprising:
  means for coding a syntax element that indicates that the pixel of the second line is scanned in the snake scan order immediately after the pixel of the first line.

30. A non-transitory computer-readable medium storing instructions thereon that, when executed, cause one or more processors of a video coder to:
  determine, for a block of video data, a palette having a plurality of entries indicating a plurality of respective color values, wherein a first line of the block of video data includes a pixel located adjacent to an edge of the block of video data, and wherein a second line of the block of video data includes a pixel located adjacent to the edge of the block and immediately adjacent to the pixel of the first line; and
  code, in a snake scan order, index values that map pixels of the block to entries in the palette, wherein the pixel of the second line immediately follows the pixel of the first line in the snake scan order.

31. The non-transitory computer-readable medium of claim 30, wherein the first line is a first row and the second line is a second row, and wherein the instructions that cause the one or more processors to code the index values in the snake scan order comprise instructions that cause the one or more processors to code an index value for the pixel in the first row immediately before coding an index value for the pixel in the second row.

32. The non-transitory computer-readable medium of claim 30, wherein the first line is a first column and the second line is a second column, and wherein the instructions that cause the one or more processors to code the index values in the snake scan order comprise instructions that cause the one or more processors to code an index value for the pixel in the first column immediately before coding an index value for the pixel in the second column.

33. The non-transitory computer-readable medium of claim 30, wherein the edge is a first edge, wherein the pixel of the second line is a first pixel of the second line, wherein the second line includes a second pixel located adjacent to a second edge of the block of video data that is parallel to the first edge, and wherein the instructions that cause the one or more processors to code the index values comprise instructions that cause the one or more processors to:

code one or more syntax elements indicating a run of consecutive pixels in the snake scan order have the same index value, wherein the run of consecutive pixels includes the pixel of the first line and the first pixel of the second line, and does not include the second pixel of the second line.

34. The non-transitory computer-readable medium of claim 30, further comprising instructions that cause the one or more processors to:

code a syntax element that indicates that the pixel of the second line is scanned in the snake scan order immediately after the pixel of the first line.

* * * * *